United States Patent
Hasumi

(10) Patent No.: US 11,014,626 B2
(45) Date of Patent: May 25, 2021

(54) ELECTRIC ASSIST SYSTEM AND ELECTRIC ASSIST VEHICLE

(71) Applicant: YAMAHA HATSUDOKI KABUSHIKI KAISHA, Iwata (JP)

(72) Inventor: Mitsuharu Hasumi, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 189 days.

(21) Appl. No.: 16/454,638

(22) Filed: Jun. 27, 2019

(65) Prior Publication Data
US 2019/0315433 A1  Oct. 17, 2019

Related U.S. Application Data

(63) Continuation of application No. PCT/JP2017/034146, filed on Sep. 21, 2017.

(30) Foreign Application Priority Data

Dec. 28, 2016  (JP) .............................. JP2016-255870

(51) Int. Cl.
*B62M 6/50*   (2010.01)
*B60W 30/188*  (2012.01)
(Continued)

(52) U.S. Cl.
CPC ............ *B62M 6/50* (2013.01); *B60W 30/188* (2013.01); *B60W 40/076* (2013.01); *G01P 3/487* (2013.01);
(Continued)

(58) Field of Classification Search
CPC ........ B62M 6/50; B62M 6/45; B60W 30/188; B60W 40/076; G01P 3/487; Y02T 10/70;
(Continued)

(56) References Cited

U.S. PATENT DOCUMENTS

2013/0179016 A1  7/2013  Gale
2014/0166383 A1  6/2014  Arimune
(Continued)

FOREIGN PATENT DOCUMENTS

CN   103419889 A   12/2013
CN   104245491 A   12/2014
(Continued)

OTHER PUBLICATIONS

Official Communication issued in corresponding Chinese Patent Application No. 201780081192.5, dated Nov. 12, 2020.
(Continued)

*Primary Examiner* — Kevin Hurley
*Assistant Examiner* — Marlon A Arce
(74) *Attorney, Agent, or Firm* — Keating and Bennett, LLP

(57) ABSTRACT

An electric power assist system generates an appropriate level of assist power while an electric assist vehicle is running on a slope and includes an electric motor that generates an assist power to assist human power of a rider of the electric assist vehicle, a controller that controls a magnitude of the assist power to be generated by the electric motor, and an acceleration sensor that outputs an acceleration signal representing an acceleration in a travel direction of the electric assist vehicle. The controller acquires speed information representing a running speed of the electric assist vehicle based on an external signal, detects an inclination angle of a road surface based on the speed information and the acceleration signal, and causes the electric motor to generate an assist power of a magnitude in accordance with the inclination angle.

24 Claims, 12 Drawing Sheets

(51) Int. Cl.
  *B60W 40/076* (2012.01)
  *G01P 3/487* (2006.01)
  *B60L 15/10* (2006.01)
  *B62M 6/80* (2010.01)
  *B60L 9/18* (2006.01)
  *B60L 15/20* (2006.01)
  *B62M 6/45* (2010.01)

(52) U.S. Cl.
  CPC .............. *B60L 9/18* (2013.01); *B60L 15/10* (2013.01); *B60L 15/2018* (2013.01); *B60L 15/2081* (2013.01); *B60L 2200/12* (2013.01); *B60L 2240/14* (2013.01); *B60L 2240/16* (2013.01); *B60L 2240/18* (2013.01); *B60L 2240/20* (2013.01); *B62M 6/45* (2013.01); *B62M 6/80* (2013.01); *Y02T 10/64* (2013.01); *Y02T 10/70* (2013.01); *Y02T 10/72* (2013.01)

(58) Field of Classification Search
  CPC ...... Y02T 10/72; Y02T 10/64; B60L 15/2018; B60L 15/2081; B60L 15/10; B60L 2200/12; B60L 2240/14; B60L 2240/16; B60L 2240/18; B60L 2240/20; B60L 50/20; B60L 9/18; B62J 99/00
  See application file for complete search history.

(56) References Cited

U.S. PATENT DOCUMENTS

| | | | |
|---|---|---|---|
| 2015/0307157 A1 | 10/2015 | Gao | |
| 2016/0375957 A1* | 12/2016 | Hashimoto | B62M 9/123 474/70 |
| 2017/0106866 A1* | 4/2017 | Schieffelin | B62J 99/00 |
| 2017/0115319 A1 | 4/2017 | Ookubo et al. | |
| 2018/0105230 A1* | 4/2018 | Munch | B62M 9/123 |
| 2019/0127018 A1* | 5/2019 | Nishino | B60T 8/1706 |
| 2019/0300115 A1* | 10/2019 | Shahana | B62M 6/45 |

FOREIGN PATENT DOCUMENTS

| | | |
|---|---|---|
| CN | 106080943 A | 11/2016 |
| DE | 10 2012 212 526 A1 | 1/2014 |
| EP | 2 377 713 A1 | 10/2011 |
| EP | 2 471 705 A1 | 7/2012 |
| EP | 2 868 562 A1 | 5/2015 |
| EP | 3 025 898 A1 | 6/2016 |
| JP | 09-226664 A | 9/1997 |
| JP | 2001-088770 A | 4/2001 |
| JP | 2001-122186 A | 5/2001 |
| JP | 2004-306818 A | 11/2004 |
| JP | 2007-223579 A | 9/2007 |
| JP | 2012-075280 A | 4/2012 |
| JP | 2014-088156 A | 5/2014 |
| JP | 2014-133552 A | 7/2014 |
| JP | 2015-189451 A | 11/2015 |
| JP | 2015-200508 A | 11/2015 |
| JP | 2015-209159 A | 11/2015 |
| JP | 2016-008044 A | 1/2016 |
| JP | 2016-030484 A | 3/2016 |
| JP | 5950268 B1 | 7/2016 |
| JP | 2016-150684 A | 8/2016 |

OTHER PUBLICATIONS

Official Communication issued in International Patent Application No. PCT/JP2017/034146, dated Dec. 12, 2017.
Official Communication issued in Taiwanese Patent Application No. 106136778, dated Nov. 21, 2018.

* cited by examiner

ELECTRIC ASSIST SYSTEM AND ELECTRIC ASSIST VEHICLE

BACKGROUND OF THE INVENTION

1. Field of the Invention

The present invention relates to an electric power assist system and an electric assist vehicle including the electric power assist system.

2. Description of the Related Art

An electric assist bicycle, by which human power of a rider pedaling the bicycle is assisted by an electric motor, is known. In such an electric assist bicycle, assist power in accordance with the human power applied by the rider to the pedal is generated by the electric motor, and a motive power as a sum of the human power and the assisting power is transmitted to a driving wheel. The human power is assisted by the electric motor, so that the load on the rider is decreased (e.g., Japanese Laid-Open Patent Publication No. 09-226664).

While a rider of an electric assist bicycle is running up or down a slope, the travel load may increase or decrease in accordance with the change in the gradient of the road surface. The electric assist bicycle is required to generate higher assist power when the travel load is increased and to generate lower assist power when the travel load is decreased.

A conventional electric assist bicycle has room for improvement regarding how to generate an assist power in accordance with the travel load. For example, the rider occasionally feels that the pedals are heavy on an ascending slope because the assist power is insufficient. The rider occasionally feels that the acceleration is large on a descending slope because the assist power is a bit too large. In such cases, the rider manually switches the driving mode (assist mode) to change the strength of the assist power, so as to obtain a required level of assist power.

If an appropriate level of assist power is generated by an electric motor in accordance with the increase or decrease in the travel load, the electric assist bicycle may be controlled more suitably to the sense of riding of the rider.

SUMMARY OF THE INVENTION

Preferred embodiments of the present invention provide electric power assist systems that generate an appropriate level of assist power while a vehicle is running on an ascending or descending slope, and electric assist vehicles including the electric power assist system.

An illustrative electric power assist system according to a preferred embodiment of the present invention for an electric assist vehicle includes an electric motor that generates an assist power to assist human power of a rider of the electric assist vehicle; a controller configured or programmed to control a magnitude of the assist power to be generated by the electric motor; and an acceleration sensor that outputs an acceleration signal representing an acceleration Gx in a travel direction of the electric assist vehicle. The controller acquires speed information representing a running speed of the electric assist vehicle based on an external signal. The controller determines an inclination angle of a road surface based on the speed information and the acceleration signal, and causes the electric motor to generate an assist power of a magnitude in accordance with the inclination angle.

The controller of the electric power assist system is configured or programmed to determine the inclination angle of the road surface based on the speed information and the acceleration signal regardless of whether the electric assist vehicle is at a stop or is running, and to cause the electric motor to generate the assist power of the magnitude in accordance with the inclination angle.

For example, upon detecting that the slope is ascending, the controller increases the assist power as the inclination angle is larger. With such a structure, the human power of the rider is assisted properly at the start on the ascending slope when the rider feels that the load is heavier. Upon determining that the slope is descending, the controller decreases the assist power as the inclination angle is larger. With such a structure, high assist power is not generated on the descending slope, and thus acceleration on the descending slope is suppressed.

On the ascending slope, the assist power is increased. Therefore, the power consumption is larger than by the conventional process. However, on the descending slope, the controller decreases the assist power upon detecting that the slope is descending. Therefore, the power consumption of the battery is suppressed more than the conventional process on the descending slope. For this reason, the power consumption of the battery is about the same as the conventional process while the level of comfort of the rider is improved.

The controller uses the acceleration Gx in the first direction as the travel direction and the speed V to determine the inclination angle of the road surface. The acceleration sensor may be a monoaxial sensor for only the travel direction, and therefore, is available at lower cost.

In a preferred embodiment of the present invention, the electric power assist system further includes a speed sensor that outputs a signal in accordance with a moving speed of the electric assist vehicle. The controller is configured or programmed to acquire the speed information based on the signal in accordance with the moving speed, the signal being received from the speed sensor. The controller determines the inclination angle of the road surface based on the speed information and the acceleration signal.

The controller uses the acceleration signal that is output from the acceleration sensor while the electric assist vehicle is running and the speed signal that is output from the speed sensor to determine the inclination angle of the road surface. The speed sensor is mounted on a general electric power assist system, and has a relatively low cost. Therefore, it is not necessary to use a gyrosensor or an acceleration sensor having a high performance and high cost, and the inclination angle is calculated with a structure that has a low cost as a whole.

In a preferred embodiment of the present invention, the electric motor includes a rotor and a position detection sensor that detects a position of the rotor of the electric motor while the rotor is rotating. The controller is configured or programmed to determine a rotation speed ω of the rotor based on an output of the position detection sensor, and multiply the rotation speed ω by a constant to acquire the speed information. Even in the case in which the vehicle does not include the speed sensor, or even in the case in which the speed sensor is out of order, the speed information is acquired based on the rotation speed of the electric motor.

In a preferred embodiment of the present invention, the electric assist vehicle includes a transmission including a plurality of transmission gear ranges and that outputs data representing a transmission gear range currently selected. The electric motor includes a rotor and position detection sensor that detects a position of the rotor while the rotor is rotating. The controller is configured or programmed to acquire data representing the transmission gear range, determine a rotation speed ω of the rotor based on an output of the position detection sensor, and acquire the speed information based on the rotation speed ω and the data representing the transmission gear range. Even in the case in which the vehicle does not include the speed sensor, or even in the case in which the speed sensor is out of order, the speed information is acquired based on the rotation speed of the electric motor.

In a preferred embodiment of the present invention, the electric assist vehicle includes a torque sensor that detects a pedal torque provided by the rider. In the case in which the pedal torque is larger than a predefined threshold value, the controller is configured or programmed to acquire the speed information and determine the inclination angle of the road surface.

In the case in which the speed information is calculated while the rider is going down the descending slope without pedaling, there is a possibility that the calculated vehicle speed becomes zero although the actual vehicle speed V is not zero. The speed information is acquired when the pedal torque exceeds the threshold value (while the rider is pedaling), so that correct speed information is acquired.

In a preferred embodiment of the present invention, the controller calculates a time-differential value (dV/dt) of a speed V in the travel direction, subtracts the time-differential value (dV/dt) from the acceleration Gx in the travel direction, and divides the subtraction result by a gravitational acceleration G to determine the inclination angle of the road surface. The actual acceleration in the travel direction generated by the running and the gravitational acceleration are used to calculate the inclination angle with high precision.

In a preferred embodiment of the present invention, the controller may perform inverse sine transformation on the division result obtained by dividing the subtraction result by the gravitational acceleration G to determine the inclination angle of the road surface. The controller includes a table correlating each of a plurality of angles and a calculated value of a sine function for each of the angles. The controller is configured or programmed to divide the subtraction result by the gravitational acceleration G and refer to the table to acquire an angle corresponding to the division result, and determine the angle as the inclination angle of the road surface. The value obtained by dividing the difference between the acceleration Gx from the acceleration sensor and the differential value of the speed V (i.e., acceleration value) by the gravitational acceleration G is a sine of the inclination angle. The controller may use this relationship to calculate the inclination angle of the road surface with high precision.

An illustrative electric assist vehicle according to a preferred embodiment of the present invention includes any one of the above-described electric power assist systems; and the speed sensor that outputs a signal in accordance with a moving speed of the electric assist vehicle. Therefore, the electric assist vehicle has the exact advantages of any of the above-described electric power assist systems.

An illustrative electric power assist system according to a preferred embodiment of the present invention for an electric assist vehicle includes an electric motor that generates an assist power to assist human power of a rider of the electric assist vehicle; a controller configured or programmed to control a magnitude of the assist power to be generated by the electric motor; and an acceleration sensor that outputs an acceleration signal representing at least one of an acceleration Gx in a first direction as a travel direction of the electric assist vehicle and an acceleration Gz in a second direction perpendicular to both of the first direction and a road surface. The controller uses the acceleration signal to determine that the electric assist vehicle is in a stop state, determine an inclination angle of the road surface based on the acceleration signal that is output in the stop state, and cause the electric motor to generate an assist power of a magnitude in accordance with the inclination angle when the rider starts pedaling the electric assist vehicle.

The electric power assist system uses the output signal of the sensor to detect that the electric assist vehicle is in a completely stop state, and detects the inclination angle in the stop state. With such a structure, the inclination angle is detected with high precision. Thus, an appropriate level of assist power is generated, and the ease of riding is improved at the start on a slope, for which assist is required.

For example, upon detecting that the slope is ascending, the controller is configured or programmed to increase the assist power as the inclination angle is larger. With such a structure, the human power of the rider is assisted properly at the start on the ascending slope, when the rider feels that the load is heavier. Upon detecting that the slope is descending, the controller is configured or programmed to decrease the assist power as the inclination angle is larger. With such a structure, high assist power is not generated on the descending slope, and thus acceleration on the descending slope is suppressed.

The electric power assist system preferably uses only the acceleration sensor to determine that the electric assist vehicle is in a stop state and to determine the inclination angle. Therefore, it is not necessary to provide various sensors, and the cost is not increased. The space in which the sensors are installed is decreased, and the structure is simplified.

In a preferred embodiment of the present invention, the controller further includes a stop detection circuit that determines that the electric assist vehicle is in the stop state based on the acceleration signal that is output from the acceleration sensor.

In a preferred embodiment of the present invention, in the case in which the acceleration signal representing at least one of the acceleration Gx in the first direction and the acceleration Gz in the second direction fulfills a predefined stop determination condition, the stop detection circuit determines that the electric assist vehicle is at a stop.

In a preferred embodiment of the present invention, the stop determination condition includes a condition regarding a range of a signal level of the acceleration signal and a condition regarding a time period in which the acceleration signal is in the range of the signal level.

In a preferred embodiment of the present invention, the acceleration sensor is a two-axis acceleration sensor or a three-axis acceleration sensor that outputs a first acceleration signal representing the acceleration Gx in the first direction and a second acceleration signal representing the acceleration Gz in the second direction. The stop detection circuit stores the stop determination condition for each of the first acceleration signal and the second acceleration signal.

Another illustrative electric power assist system according to a preferred embodiment of the present invention for an electric assist vehicle includes an electric motor that generates an assist power to assist human power of a rider of the electric assist vehicle; a controller configured or programmed to control a magnitude of the assist power to be generated by the electric motor; and an acceleration sensor that outputs an acceleration signal representing at least one of an acceleration Gx in a first direction as a travel direction of the electric assist vehicle and an acceleration Gz in a second direction perpendicular to both of the first direction and a road surface. The controller receives a detection signal based on whether it is determined that the electric assist vehicle is at a stop or is running, the detection signal being received from at least one sensor that outputs the detection signal, and detects, based on the detection signal, that the electric assist vehicle is in a stop state. The controller determines an inclination angle of the road surface based on the acceleration signal that is output in the stop state, and causes the electric motor to generate an assist power of a magnitude in accordance with the inclination angle when the rider starts pedaling the electric assist vehicle.

The controller uses the output signal of the sensor to determine that the electric assist vehicle is in a completely stop state, and determines the inclination angle in the stop state. With such a structure, the inclination angle is determined with high precision. Thus, an appropriate level of assist power is generated, and the ease of riding is improved at the start on a slope, for which assist is required.

For example, upon detecting that the slope is ascending, the controller is configured or programmed to increase the assist power as the inclination angle is larger. With such a structure, the human power of the rider is assisted properly at the start on the ascending slope, when the rider feels that the load is heavier. Upon detecting that the slope is descending, the controller is configured or programmed to decrease the assist power as the inclination angle is larger. With such a structure, high assist power is not generated on the descending slope, and thus acceleration on the descending slope is suppressed.

In a preferred embodiment of the present invention, the controller is configured or programmed to further include a stop detection circuit that determines that the electric assist vehicle is at a stop based on the detection signal that is output from the at least one sensor.

In a preferred embodiment of the present invention, the at least one sensor is one or a plurality of sensors among a speed sensor, a torque sensor, a crank rotation sensor, and a Hall sensor that detects a rotation of the electric motor. In the case in which the detection signal fulfills a predefined stop determination condition, the stop detection circuit determines that the electric assist vehicle is at a stop.

In a preferred embodiment of the present invention, in the case in which the at least one sensor is the speed sensor, which detects a speed of the electric assist vehicle, the stop detection circuit determines that the electric assist vehicle is at a stop in the case in which the detection signal fulfills the stop determination condition, which is that the speed is lower than a predefined speed.

In a preferred embodiment of the present invention, the electric power assist system further includes a crankshaft to which a pedal is attached. In the case in which the at least one sensor is the torque sensor, which detects a torque applied to the crankshaft by the rider stepping on the pedal, the stop detection circuit determines that the electric assist vehicle is at a stop in the case in which the detection signal fulfills the stop determination condition, which is that the torque is lower than a predefined torque value.

In a preferred embodiment of the present invention, the electric power assist system further includes a crankshaft to which a pedal is attached. In the case in which the at least one sensor is the crank rotation sensor, which detects a rotation of the crankshaft, the stop detection circuit determines that the electric assist vehicle is at a stop in the case in which the detection signal fulfills the stop determination condition, which is that the number of rotations of the crankshaft within a predefined time period is zero.

In a preferred embodiment of the present invention, in the case in which the at least one sensor is the Hall sensor, the stop detection circuit determines that the electric assist vehicle is at a stop in the case in which the detection signal fulfills the stop determination condition, which is that the number of rotations of the electric motor within a predefined time period is zero.

In a preferred embodiment of the present invention, the controller is configured or programmed to include a gradient calculation circuit that calculates the inclination angle based on the acceleration signal that is output in the stop state, an assist power calculation circuit that determines the magnitude of the assist power in accordance with the inclination angle, and a motor driving circuit that causes the electric motor to generate the assist power determined by the assist power calculation circuit when the rider starts pedaling the electric assist vehicle. The gradient calculation circuit performs a calculation of $\arcsin(Gx/G)$ or $\arccos(Gz/G)$ using a gravitational acceleration G to determine the inclination angle.

In a preferred embodiment of the present invention, the acceleration sensor is a two-axis acceleration sensor or a three-axis acceleration sensor that outputs a first acceleration signal representing the acceleration Gx in the first direction and a second acceleration signal representing the acceleration Gz in the second direction.

In a preferred embodiment of the present invention, the controller is configured or programmed to include a gradient calculation circuit that calculates the inclination angle based on the acceleration signal that is output in the stop state, an assist power calculation circuit that determines the magnitude of the assist power in accordance with the inclination angle, and a motor driving circuit that causes the electric motor to generate the assist power determined by the assist power calculation circuit when the rider starts pedaling the electric assist vehicle. The gradient calculation circuit performs at least one of calculations of $\arcsin(Gx/G)$, $\arccos(Gz/G)$ and $\arctan(Gx/Gz)$ using a gravitational acceleration G to determine the inclination angle.

In a preferred embodiment of the present invention, the assist power calculation circuit stores in advance a rule defining a correlation between a magnitude of the inclination angle and the magnitude of the assist power, and uses the inclination angle calculated by the gradient calculation circuit and the rule to determine the magnitude of the assist power.

In a preferred embodiment of the present invention, the electric power assist system further includes a switch selectable by the rider to select one of a plurality of driving modes that are different in the magnitude of the assist power while the electric assist vehicle is running. The assist power calculation circuit stores in advance the rule for each of the driving modes, and uses the inclination angle calculated by the gradient calculation circuit and the rule corresponding to the driving mode selected by use of the switch to determine the magnitude of the assist power when the rider starts pedaling the electric assist vehicle.

In a preferred embodiment of the present invention, the assist power calculation circuit stores in advance, as the rule, a function of which the magnitude of the inclination angle is an input and the magnitude of the assist power is an output.

In a preferred embodiment of the present invention, the function is at least one of a discontinuous function, a linear continuous function and a nonlinear continuous function.

In a preferred embodiment of the present invention, the assist power calculation circuit stores in advance a table correlating the magnitude of the inclination angle and the magnitude of the assist power.

In a preferred embodiment of the present invention, the gradient calculation circuit uses the first acceleration signal and the second acceleration signal processed by a low-pass filter to calculate the inclination angle.

In a preferred embodiment of the present invention, the controller is configured or programmed to cause the electric motor to generate the assist power in accordance with the inclination angle, with a start of pedaling being the time point at which the rider pedals the electric assist vehicle at most 5 times.

In a preferred embodiment of the present invention, the controller is configured or programmed to cause the electric motor to generate the assist power in accordance with the inclination angle, with a start of pedaling being the time point at which the rider pedals the electric assist vehicle at most 3 times.

In a preferred embodiment of the present invention, in the case in which the inclination angle is an elevation angle in the travel direction of the electric assist vehicle, the controller is configured or programmed to cause the electric motor to generate an assist power sufficiently large to increase the inclination angle when the rider starts pedaling the electric assist vehicle.

In a preferred embodiment of the present invention, in the case in which the inclination angle is a declination angle in the travel direction of the electric assist vehicle, the controller is configured or programmed to cause the electric motor to generate an assist power sufficiently small to increase the inclination angle when the rider starts pedaling the electric assist vehicle.

An illustrative electric assist vehicle according to a preferred embodiment of the present invention includes any one of the above-described electric power assist systems.

An illustrative electric assist vehicle according to a preferred embodiment of the present invention includes the electric power assist system in any one of the above-described various forms; and the at least one sensor.

According to an illustrative preferred embodiment of the present invention, in the state in which the electric assist vehicle is in a completely stop state, the detection signal of the acceleration sensor is used to determine the inclination angle. While the electric assist vehicle is in the stop state, the inclination angle is detected with high precision. Therefore, an appropriate level of assist power is generated. Thus, the ease of riding is improved at the start on a slope, for which assist is required.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, electric power assist systems and electric assist vehicles according to preferred embodiments of the present invention will be described with reference to the attached drawings. As a preferred embodiment of the electric assist vehicle, an electric assist bicycle will be described. In the following description, the "inclination" of the term "inclination angle" represents the inclination of the road surface with respect to the travel direction (proceeding direction) of the electric assist bicycle, namely, the inclination in the ascending direction and the descending direction (so-called pitch direction). It should be noted that the "inclination" is different from an inclination in a left-right direction (so-called roll direction) with respect to the proceeding direction.

Preferred Embodiment 1

In general, a rider of an electric assist bicycle feels that the load is heavy when starting to pedal the bicycle. Especially when starting to pedal the bicycle on an ascending slope, the rider needs to pedal with a large force. Therefore, in order to start the bicycle on the ascending slope, it is considered to be necessary to operate an electric motor to generate an assist power. By contrast, in order to start the bicycle on a descending slope, high assist power is not needed often times.

An electric assist bicycle according to an illustrative preferred embodiment of the present disclosure calculates an inclination angle in the state of being at a stop and generates the assist power in accordance with the magnitude of the inclination angle.

Figure 1:
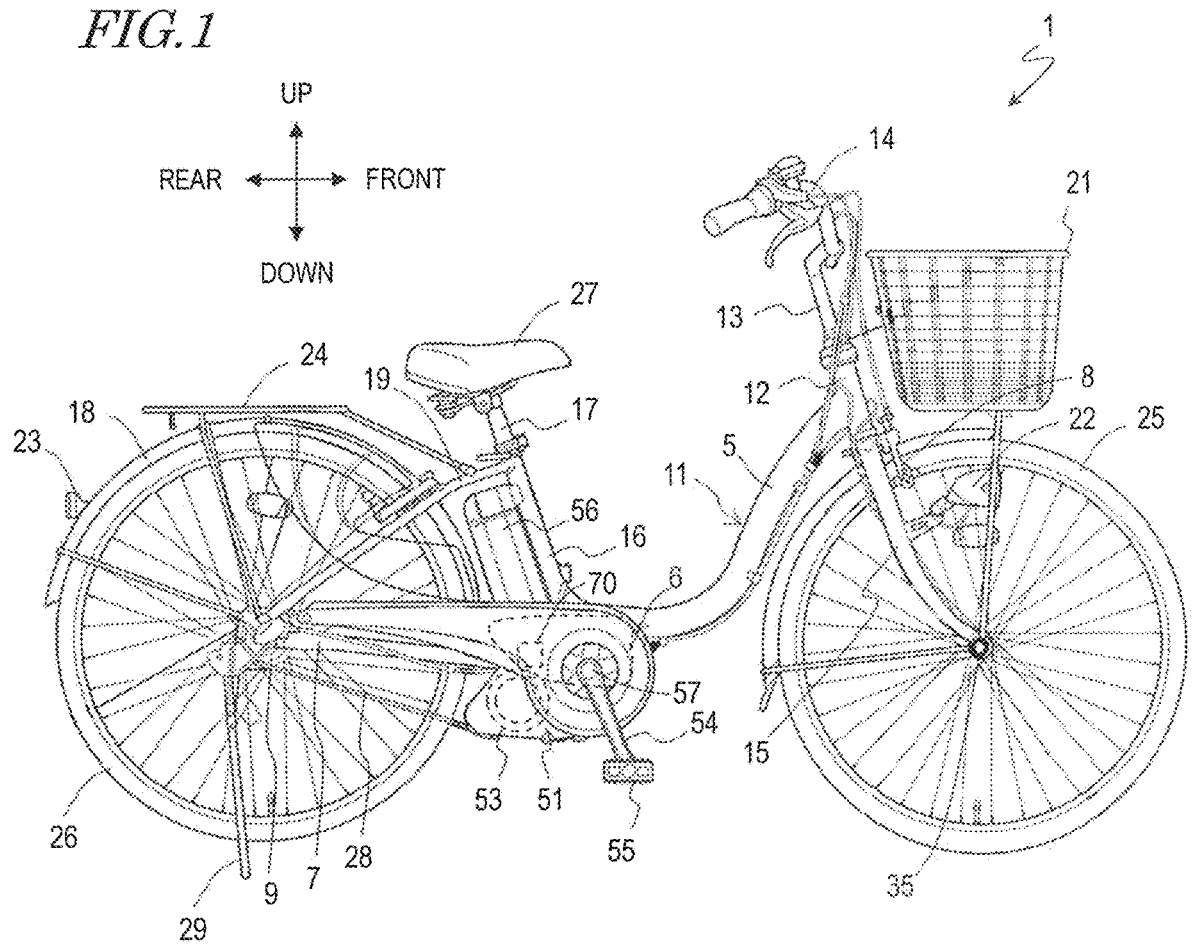
FIG. 1 is a side view showing an electric assist bicycle 1 according to an illustrative preferred embodiment of the present invention.

FIG. 1 is a side view showing an electric assist bicycle 1 according to a preferred embodiment of the present invention. The electric assist bicycle 1 includes a driving unit 51 described in detail below. The electric assist bicycle 1 is an example of electric assist vehicle according to a preferred embodiment of the present invention. The driving unit 51 is an example of electric power assist system according to a preferred embodiment of the present invention.

The electric assist bicycle 1 includes a vehicle frame 11 extending in a front-rear direction. The vehicle frame 11 includes a head pipe 12, a down tube 5, a bracket 6, a tune stay 7, a seat tube 16, and a seat stay 19. The head pipe 12 is located at a front end of the vehicle frame 11. A handle stem 13 is rotatably inserted into the head pipe 12. A handle 14 is secured to a top end of the handle stem 13. A front fork 15 is secured to a bottom end of the handle stem 13. A front wheel 25, which is a steering wheel, is rotatably supported at a bottom of the front fork 15. The front fork 15 is provided with a brake 8 that brakes the front wheel 25. A front basket 21 is provided on the front of the head pipe 12. The front fork 15 is provided with a head lamp 22.

The down tube 5 extends obliquely rearward and downward from the head pipe 12. The seat tube 16 extends upward from a rear end of the down tube 5. The chain stay 7 extends rearward from a bottom end of the seat tube 16. The bracket 6 connects the rear end of the down tube 5, the bottom end of the seat tube 16 and a front end of the chain stay 7 to each other.

A seat post 17 is inserted into the seat tube 16, and a saddle 27, on which a rider is to sit, is provided at a top end of the seat post 17. A rear portion of the chain stay 7 supports a rear wheel 26, which is a driving wheel, such that the rear wheel 26 is rotatable. A brake 9 that brakes the rear wheel 26 is provided to the rear of the chain stay 7. A stand 29 is provided to the rear of the chain stay 7. While the electric assist bicycle 1 is parked, the stand 29 holds the electric assist bicycle 1 with both of the wheels standing. The seat stay 19 extends obliquely rearward and downward from a top portion of the seat tube 16. A bottom end of the seat stay 19 is connected with the rear portion of the chain stay 7. The seat stay 19 supports a rack 24 provided to the rear of the saddle 27 and also supports a fender 18 covering a top portion of the rear wheel 26. A tail light 23 is provided to the rear of the fender 18.

The bracket 6, which is located on the vehicle frame 11, at a position in the vicinity of the center of the vehicle, is provided with a driving unit 51. The driving unit 51 includes an electric motor 53, a crankshaft 57, a controller 70 and an acceleration sensor 38. A battery 56 that supplies power to the electric motor 53 and the like is mounted on the bracket 6. The battery 56 may be supported by the seat tube 16.

The crankshaft 57 is supported throughout the driving unit 51 in the left-right direction. Crank arms 54 are provided at both of two ends of the crankshaft 57. A pedal 55 is rotatably provided at a tip of each of the crank arms 54.

The controller 70 controls an operation of the electric assist bicycle 1. The controller 70 is typically a semiconductor integrated circuit, such as a microcontroller, a signal processor or the like, that is configured or programmed to process digital signals. A rotation output of the crankshaft 57 generated when the rider steps on, and rotates, the pedal 55 with his/her foot is transmitted to the rear wheel 26 via a chain 28. The controller 70 controls the electric motor 53 to generate an assist power in accordance with the rotation output of the crankshaft 57. The assist power generated from the electric motor 53 is transmitted to the rear wheel 26 via the chain 28. Instead of the chain 28, a belt, a shaft or the like may be used.

A type of electric assist bicycle transmits the human power and the assist power to the crankshaft 57 and transmits the resultant force to the rear wheel 26 via the chain 28 or the like. The technology according to the present disclosure is applicable to an electric assist bicycle that synthesizes the human power and the assist power by the chain 28 or the like (FIG. 1) and also is applicable to an electric assist bicycle that synthesizes the human power and the assist power by the crankshaft 57.

In this preferred embodiment, the controller 70 receives a detection signal that is output from one or a plurality of sensors among a group of sensors described below, and based on the detection signal, determines whether the electric assist bicycle 1 is currently at a stop or running. Upon determining that the electric assist bicycle 1 is currently in a stop state, the controller 70 determines the inclination angle of the road surface based on an acceleration signal that is output from the acceleration sensor in the stop state, and causes the electric motor to generate an assist power of a magnitude in accordance with the inclination angle when the rider starts pedaling the electric assist bicycle 1. The acceleration signal detected by the acceleration sensor has a precision that is higher while the electric assist bicycle 1 is at a stop than while the electric assist bicycle 1 is running. Namely, the precision of the inclination angle detected by use of the acceleration signal that is output in the stop state is higher. Since an appropriate level of assist power in accordance with the inclination angle is generated, the riding comfort when the electric assist bicycle 1 is started on a slope, for which assist is required, is improved.

The group of sensors usable to detect whether the electric assist bicycle 1 is currently at a stop or running include, for example, a speed sensor, a torque sensor, a crank rotation sensor, and a Hall sensor and an acceleration sensor, both of which detect the rotation of the electric motor.

Hereinafter, a specific structure of the controller 70, and the group of sensors that generate a signal usable to operate the controller 70, will be described in detail.

Figure 2:
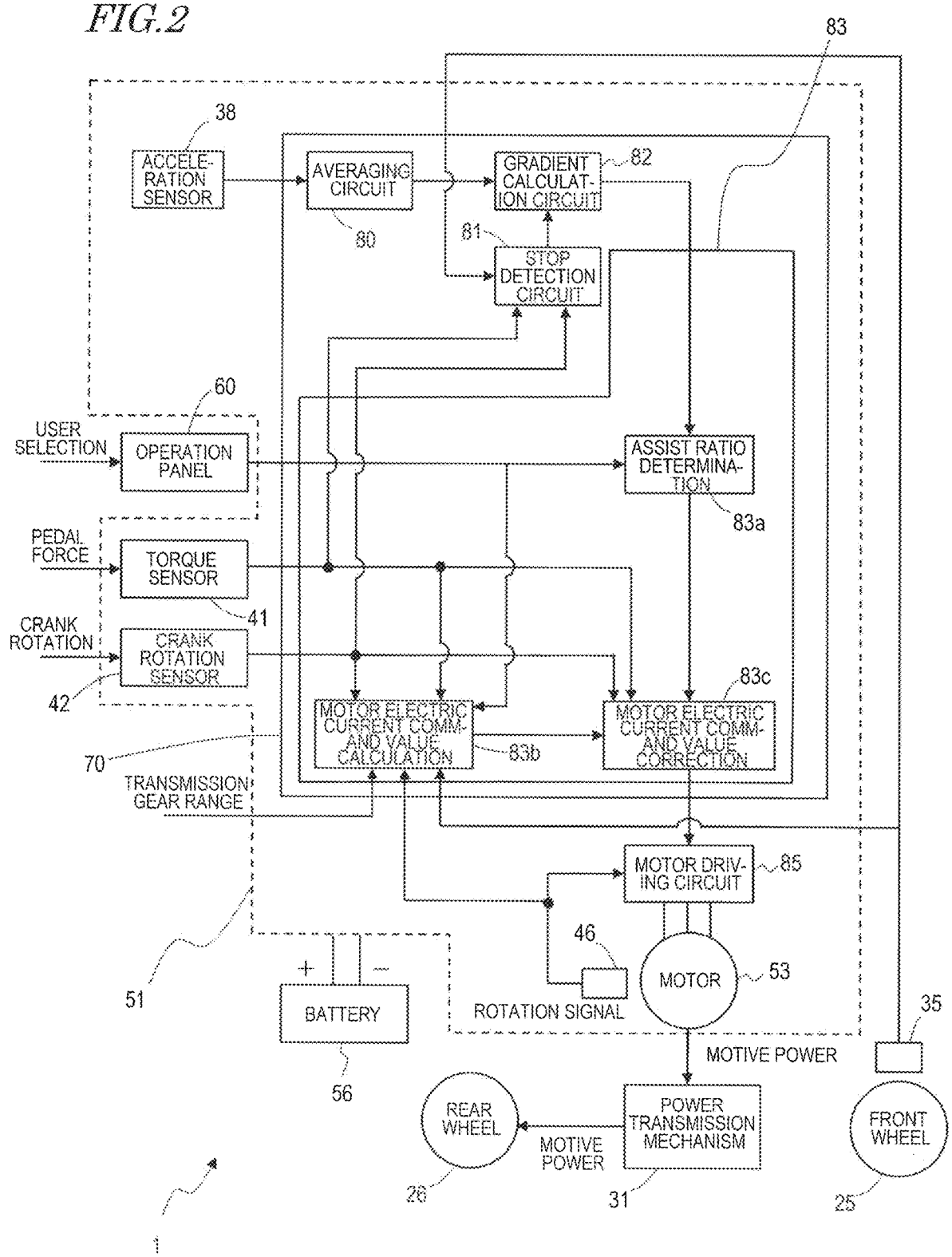
FIG. 2 is a hardware block diagram mainly showing a structure of a controller 70.

FIG. 2 is a hardware block diagram mainly showing a structure of the controller 70. FIG. 2 also shows a peripheral environment of the controller 70. In the peripheral environment, for example, various sensors that output a signal to the controller 70 and the driving motor 53 driven as a result of the operation of the controller 70 are shown.

First, the peripheral environment of the controller 70 will be described.

As described above, the controller 70 is included in the driving unit 51. FIG. 2 shows the acceleration sensor 38, a torque sensor 41, a crank rotation sensor 42, the electric motor 53 and a motor driving circuit 85, which are also included in the driving unit 51.

The acceleration sensor 38 is a small electronic component of several millimeters square, for example, that detects an acceleration of a vehicle main body of the electric assist bicycle 1. The acceleration sensor 38 is, for example, a three-axis acceleration sensor of a piezo resistance type, an electrostatic capacitance type, or a heat sensing type. One such three-axis acceleration sensor is capable of measuring the acceleration in each of three axial directions perpendicular to each other (X-axis, Y-axis and Z-axis directions).

In this specification, the three axial directions perpendicular to each other (X-axis, Y-axis, and Z-axis directions) are not of an absolute coordinate system but are of a relative coordinate system. More specifically, the three axial directions perpendicular to each other (X-axis, Y-axis and Z-axis directions) are respectively the front-rear direction, the left-right direction, and an up-down direction of the electric assist bicycle 1 including the acceleration sensor 38. The forward direction of the electric assist bicycle 1 matches the travel direction thereof, and the up-down direction of the electric assist bicycle 1 matches a direction perpendicular to the road surface. Therefore, the X axis, the Y axis and the Z axis of the electric assist bicycle 1 running on a flat road may not match the X axis, the Y axis and the Z axis of the electric assist bicycle 1 running on a slope.

In order to allow the acceleration sensor 38 to measure acceleration values in the front-rear direction, the left-right direction and the up-down direction of the electric assist bicycle 1, various methods are conceivable. For example, the acceleration sensor 38 may be attached to the driving unit 51 such that the X axis, the Y axis and the Z axis of the acceleration sensor 38 respectively match the front-rear direction, the left-right direction, and the up-down direction of the vehicle. Such a manner of attaching the acceleration sensor 38 indicates that the acceleration sensor 38 is placed on a horizontal surface.

The acceleration sensor 38 is placed on an electronic circuit board (not shown). Also placed on the electronic board is a control portion including a power source that transmits power from the battery to each of the electronic components of the electric assist bicycle 1, the motor driving circuit 85, and various IC chips such as the controller 70 and the like. These elements are each a component included in the control portion of the electronic circuit board described above.

The above-described electronic circuit board may be located as vertically standing in the driving unit 51 for the reason of size restriction or the like. In this case, the acceleration sensor 38 is not placed on the horizontal surface. Therefore, the acceleration value that is output from the acceleration sensor 38 needs to be smaller than the acceleration value that is to be output in the case in which the acceleration sensor 38 is placed on the horizontal surface, by a magnitude corresponding to the angle at which the acceleration sensor 38 is attached to the driving unit 51. In other words, detection direction correction needs to be performed. A specific processing content of the detection direction correction is known, and will not be described in detail in this specification. The output values of the acceleration sensor 38 may be corrected in advance, so that the output values of the acceleration sensor 38 regarding the X axis, the Y axis and the Z axis are measured as the acceleration values of the electric assist bicycle 1 in the front-rear direction, the left-right direction and the up-down direction.

It is preferred that the acceleration sensor 38 is located at a position close to the center of gravity of the electric assist bicycle 1. As understood from FIG. 1, the driving unit 51 is located close to the pedals 55. Therefore, the acceleration sensor 38 is considered to be located close to the center of gravity of the electric assist bicycle 1.

In order to prevent the acceleration sensor 38 from being restricted by the direction in which the electronic circuit board is installed, it is conceivable to provide the acceleration sensor 38 separately from the electronic circuit board. In the case in which the acceleration sensor 38 and the electronic circuit board are separate from each other, the acceleration sensor 38 may be located, with higher precision, closer to the center of gravity of the electric assist bicycle 1 in a still state.

The three-axis acceleration sensor is an example of the acceleration sensor 38. The acceleration sensor 38 merely needs to be capable of measuring at least one of an acceleration Gx in the X-axis direction and an acceleration Gz in the Z-axis direction. Alternatively, a two-axis acceleration sensor capable of measuring at least one of the acceleration Gx in the X-axis direction and the acceleration Gz in the Z-axis direction may be adopted. Still alternatively, a plurality of acceleration sensors may be used to measure accelerations in different axial directions respectively. For example, in the case in which the acceleration Gz in the Z-axis direction is not to be used, the acceleration sensor 38 may output only the acceleration Gx in the X-axis direction, or may output the acceleration Gx in the X-axis direction and an acceleration Gy in the Y-axis direction.

The torque sensor 41 detects the human power (pedal force) applied by the rider to each of the pedals 55 as a torque generated at the crankshaft 57. The magnitude of the detected torque is output as an amplitude of a voltage signal. The torque sensor 41 may include a torque calculation circuit (not shown) that converts the voltage signal into a torque. The torque calculation circuit converts, for example, an output analog voltage signal into a digital voltage signal. The magnitude of the detected torque is output as a value of the digital voltage signal. As described above, the torque sensor 41 may output an analog signal or a digital signal.

The crank rotation sensor 42 detects a rotation angle of the crankshaft 57. For example, the crank rotation sensor 42 detects the rotation of the crankshaft 57 at every predetermined angle and outputs a rectangular wave signal or a sine wave signal. The output signal may be used to calculate a rotation angle and a rotation speed of the crankshaft 57. The crank rotation sensor 42 may include a calculation circuit that calculates the rotation angle and the rotation speed of the crankshaft 57 based on the output signal.

The motor driving circuit 85 is, for example, an inverter. The motor driving circuit 85 supplies, from the battery 56 to the electric motor 53, an electric current having an amplitude, a frequency, a flow direction or the like in accordance with a motor electric current command value from the controller 70. The electric motor 53 supplied with the electric current rotates to generate an assist power of a determined magnitude. The assist power is transmitted to the rear wheel 26 via a power transmission mechanism 31. The power transmission mechanism 31 is a generic name of, for example, a decelerator (not shown) that decelerates the rotation of the electric motor 53, the chain 28, and a transmission mechanism (not shown), including a plurality of transmission gear ranges, provided on for the rear wheel 26. With the above-described structure, the human power of the rider of the electric assist bicycle 1 is assisted. The transmission mechanism is capable of outputting data that represents the transmission gear range currently selected.

The rotation of the electric motor 53 is detected by the Hall sensor 46. The Hall sensor 46 detects a magnetic field that is generated by a rotor (not shown), of the electric motor 53, that is rotating, and outputs a voltage signal in accordance with the strength or the polarity of the magnetic field.

The position of the rotor, which is changing by the rotation, is learned based on the voltage signal that is output from the Hall sensor 46. The Hall sensor 46 is a position detection sensor. The Hall sensor 46 may be used to determine the rotation speed of the rotor.

The controller 70 receives a detection signal that is output from each of the torque sensor 41 and the crank rotation sensor 42 and an operation signal that is output from an operation panel 60, and determines the magnitude of the assist power. The controller 70 transmits a motor electric current command value, based on which the assist power of the determined magnitude is to be generated, to the motor driving circuit 85. As a result, the electric motor 53 rotates, and the motive power of the electric motor 53 is transmitted to the rear wheel. In this manner, the motive power of the electric motor 53 is added to the human power of the rider.

In general, in the case in which the detection signal that is output from any of the various sensors is an analog signal, an A/D conversion circuit (not shown) that converts an analog signal into a digital signal may be provided on a stage before the detection signal is input to the controller 70. The A/D conversion circuit may be provided in each of the sensors, or may be provided on a signal path, in the driving unit 51, between each of the sensors and the controller 70. Alternatively, the A/D conversion circuit may be provided in the controller 70.

In this preferred embodiment, when it is determined that the electric assist bicycle 1 is in a stop state and then determined that the rider started pedaling the electric assist bicycle 1 that has been in the stop state, the controller 70 causes the electric motor 53 to generate the assist power of the magnitude in accordance with the inclination angle of the electric assist bicycle 1 at a stop position. The assist power of the magnitude in accordance with the inclination angle may change in accordance with the assist mode currently selected. The assist mode may be selected by the rider operating the operation panel 60.

The operation panel 60 is attached to the handle 14 of the electric assist bicycle 1 and is connected with the controller 70 by, for example, a wire cable. The operation panel 60 transmits an operation signal, representing the operation made by the rider, to the controller 70, and receives various information to be proposed to the rider from the controller 70.

Figure 3:
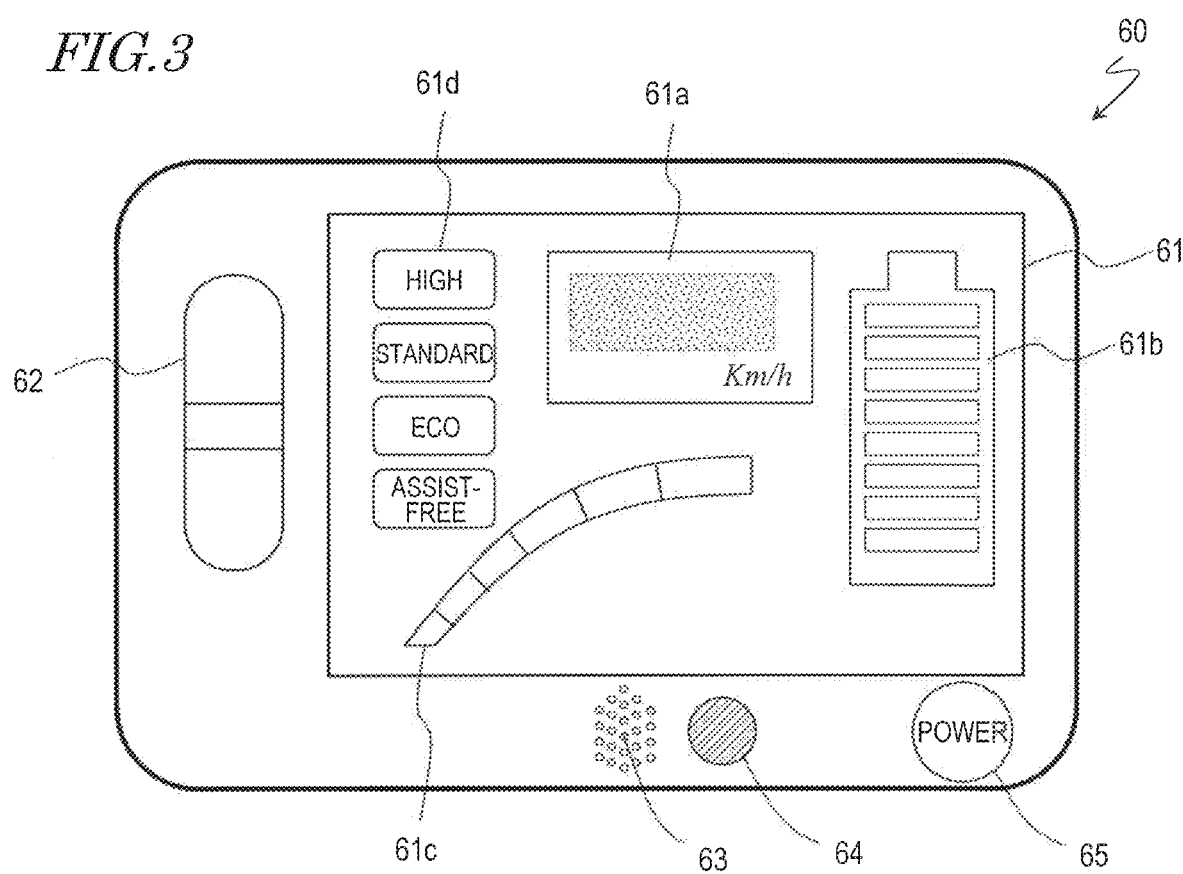
FIG. 3 is an external view of a control panel 60.

FIG. 3 is an external view of the control panel 60, which is illustrative. The operation panel 60 is attached to the handle 14, at, for example, a position close to a left grip thereof.

The operation panel 60 includes a display panel 61, an assist mode operation switch 62, and a power source switch 65.

The display panel 61 is, for example, a liquid crystal panel. The display panel 61 displays information provided by the controller 70 that includes the speed of the electric assist bicycle 1, the remaining capacitance of the battery 56, information on the range in which the assist ratio is to be changed, the assist mode, and other running information.

The display panel 61 includes a speed display area 61*a*, a battery remaining capacitance display area 61*b*, an assist ratio change range display area 61*c*, and an assist mode display area 61*d*. The display panel 61 acts as a notification device that notifies the rider of such information and the like. In this example, the display panel 61 displays the information. Alternatively, the display panel 61 may output an audio signal to notify the rider of the information.

The speed display area 61*a* displays the speed of the electric assist bicycle 1 by numerical figures. In this preferred embodiment, a vehicle speed of the electric assist bicycle 1 is detected by a speed sensor 35 provided on the front wheel 25.

The battery remaining capacitance display area 61*b* displays the remaining capacitance of the battery 56 by segments based on information on the battery remaining capacitance that is output from the battery 56 to the controller 70. With such a display, the rider intuitively grasps the remaining capacitance of the battery 56.

The assist ratio change range display area 61*c* displays the range, set by the controller 70, in which the assist ratio is to be changed. The range is displayed by segments. The assist ratio, within the change ratio, that is currently used may be displayed.

The assist mode display area 61*d* displays the assist mode selected by the rider operating the assist mode operation switch 62. The assist mode is, for example, "high", "standard" or "automatic ecological". In the case in which the rider operates the assist mode operation switch 62 to select "assist mode off", the assist mode display area 61*d* displays "assist-free".

The assist mode selection switch 62 is for the rider to select one of the plurality of assist modes (including "assist mode off") described above. When one of the plurality of assist modes is selected, a microcontroller (not shown) provided inside the operation panel 60 transmits an operation signal, specifying the selected assist mode, to the controller 70.

The power source switch 65 is a switch by which the power source of the electric assist bicycle 1 is switched on or off. The rider presses the power source switch 65 to switch the power source of the electric assist bicycle 1 on or off.

The operation panel 60 further includes a speaker 63 that provides necessary information to the rider by an audio signal and a lamp 64 that provides necessary information to the rider by light. When, for example, the controller 70 determines that the rider started pedaling the electric assist bicycle 1 from the stop state, the electric assist bicycle 1 generates the assist power in accordance with the inclination angle at the position thereof. At this point, it is notified to the rider by, for example, the output of an audio signal and/or blinking of light, that the rider is detected to have started pedaling the electric assist bicycle 1 and that the assist power in accordance with the inclination angle is applied in addition to the usual assist power. The "usual assist power" is assist power applied in accordance with the pedal force applied by the rider to the pedal 55. As a result of the notification, the rider recognizes that assist power larger than the usual assist power is generated. Alternatively, the handle 14 and/or the saddle 27 may be vibrated to notify the rider that the rider is detected to have started pedaling the electric assist bicycle 1 and that the assist power in accordance with the inclination angle is applied.

While the assist power in accordance with the inclination angle is applied, the speaker 63 may be caused to generate an audio signal of a volume that is heard by people around the electric assist bicycle 1, or the head lamp 22 and the tail lamp 23 may be lit up or blinked. With such a structure, the people around the electric assist bicycle 1 recognize that the electric assist bicycle 1 started moving and that the electric assist bicycle 1 generates assist power larger than the usual assist power.

The assist power of the electric motor 53 is highest in the "high" mode, is lowest in the "automatic ecological" mode, and is middle in the "standard" mode in response to the crank rotation output.

In the case in which the assist mode is "standard", the electric motor 53 generates assist power when the electric assist bicycle 1 is started, is running on a flat road, or is running on an ascending slope. In the case in which the assist mode is "high", the electric motor 53 generates assist power when the electric assist bicycle 1 is started, is running on a flat road, or is running on an ascending slope, like in the case in which the assist mode is "standard". In the case in which the assist mode is "high", the electric motor 53 generates higher assist power than in the case in which the assist mode is "standard" in response to the same crank rotation output. In the case in which the assist mode is "automatic ecological", the electric motor 53 appropriately changes the magnitude of the assist power in accordance with the running situation. Namely, the magnitude of the assist power is not constant unlike in the case in which the assist mode is "high" or "standard". In the case in which the assist mode is "assist-free mode", the electric motor 53 does not generate any assist power.

As described above, the assist power in response to the crank rotation output is varied in accordance with the assist mode described above. In this example, the assist mode is switched to any one of four stages. Alternatively, the assist mode may be switched to any of three stages or less, or any of five stages or more.

Now, an internal structure of the controller 70 will be described with reference to FIG. 2 again, and then, an operation of the controller 70 will be described.

The controller 70 includes an averaging circuit 80, a stop detection circuit 81, a gradient calculation circuit 82, and an assist power calculation circuit 83. In this preferred embodiment, the controller 70 will be described as being an integrated circuit including a plurality of circuits. Such a structure is merely an example. A process realized by one or a plurality of circuits may be realized by software and a signal processor.

The averaging circuit 80 is a digital filtering circuit that smooths a detection signal in each of axial directions that is output from the acceleration sensor 38. The averaging circuit 80 may, for example, calculate a movement average of a plurality of detection signals to smooth the detection signals. Another smoothing algorithm may be used. In this preferred embodiment, the averaging circuit 80 is used. However, according to a preferred embodiment of the present invention, it is not indispensable to provide the averaging circuit 80.

The stop detection circuit 81 determines whether or not the electric assist bicycle 1 fulfills a predefined vehicle stop condition. When determining that the predefined vehicle stop condition is fulfilled, the stop detection circuit 81 outputs a signal, indicating that the electric assist bicycle 1 is currently at a stop, to the gradient calculation circuit 82.

There may be various vehicle stop conditions. Examples (A) through (C) of the vehicle stop condition are shown below. In this preferred embodiment, each of the vehicle stop conditions is considered to be fulfilled when fulfilling two or more of a plurality of threshold conditions (0) through (7). The numerical figures in the threshold conditions (0) through (7) are examples. The numerical figures may vary in accordance with the gender or age of the rider, district of sales or the like assumed at the time of development of the electric assist bicycle 1.

Threshold Conditions:
(0) continues for 3 seconds or longer
(1) −100 mG<Gx<100 mG
(2) −100 mG<Gy<100 mG
(3) −100 mG<Gz<100 mG
(4) speed detected by the speed sensor<2 km/h
(5) torque value detected by the torque sensor<10 Nm
(6) number of rotations per unit of time detected by the crank sensor<5 rpm
(7) number of rotations per unit of time of the motor<100 rpm.

Vehicle Stop Conditions:
(A) fulfills threshold condition (0) and threshold condition (1) or (4) at the same time
(B) fulfills threshold condition (0), threshold condition (1), and one or a plurality of threshold conditions (2) through (7) at the same time
(C) fulfills threshold condition (0), threshold condition (4), and one or a plurality of threshold conditions (1) through (3) and (5) through (7) at the same time.

Threshold condition (6) represents the number of rotations per unit of time of the crankshaft 57, but may be converted into the angle at which the crankshaft 57 rotates per unit of time. In the above-described example, threshold condition (6) may be replaced with "rotation angle of the crankshaft 57 detected by the crank sensor for 1 minute<1800 degrees". This is applicable to the number of rotations per unit of time of the electric motor 53 represented by threshold condition (7). In this specification, the "number of rotations per unit of time" may be referred to simply as the "number of rotations".

Regarding vehicle stop condition (A), a determination may be made on whether or not the condition that threshold condition (0) and (1) are fulfilled at the same time, by use of only a detection signal output by the acceleration sensor 38. Vehicle stop condition (B) may also include a condition on which a determination may be made by use of only a detection signal output by the acceleration sensor 38. As long as the above-described conditions are fulfilled at the same time, the electric assist bicycle 1 may be considered to be at a stop. Preferred embodiments of the present invention may encompass a form in which it is determined whether or not the electric assist bicycle 1 is in a stop state by use of only the acceleration sensor 38. Since the number of the sensors required to determine whether or not the electric assist bicycle 1 is in the stop state is decreased, the structure is simplified and the cost of the driving unit 51 is decreased.

The gradient calculation circuit 82 calculates the gradient (inclination angle) θ at the current position of the electric assist bicycle 1 by use of a detection signal that is output from the acceleration sensor 38. In this preferred embodiment, the gradient calculation circuit 82 calculates the inclination angle θ when receiving, from the stop detection circuit 81, a signal indicating that the electric assist bicycle 1 is currently at a stop. Since it is not necessary to constantly calculate the inclination angle, the calculation load is suppressed. Therefore, the influence of such a calculation on the remaining capacitance of the battery 56 is decreased.

There may be various methods for calculating the inclination angle θ by the gradient calculation circuit 82. Where the gravitational acceleration is "G", the acceleration in the X-axis direction is "Gx", and the acceleration in the Z-axis direction is "Gz", the inclination angle θ may be determined by any one of the following numerical expressions (i) through (iii).

$$\theta = \arcsin(Gx/G) \quad \text{(i)}$$

$$\theta = \arccos(Gz/G) \quad \text{(ii)}$$

$$\theta = \arctan(Gx/Gz). \quad \text{(iii)}$$

As is clear from the numerical expressions (i) through (iii), the gravitational acceleration G is known. Therefore, as long as at least one of the acceleration Gx in the X-axis direction and the acceleration Gz in the Z-axis direction is determined, the gradient calculation circuit 82 determines the inclination angle θ. In the case in which both of the accelerations Gx and Gz are determined, two or three of the numerical expressions (i) through (iii) may be used to determine inclination angles θ. The gradient calculation circuit 82 may use the plurality of obtained inclination angles θ to determine one inclination angle θ. For example, the gradient calculation circuit 82 may determine an average value of the plurality of obtained inclination angles θ and use the average value as the inclination angle. As is apparent from the above description, the gradient calculation circuit 82 may use at least one of the numerical expressions (i) through (iii) to determine the inclination angle.

Now, the above-described numerical expression (iii) will be described specifically. In the following example, it is assumed that the acceleration sensor 38 is capable of determining at least the acceleration Gx in the X-axis direction and the acceleration Gz in the Z-axis direction.

Figure 4A:
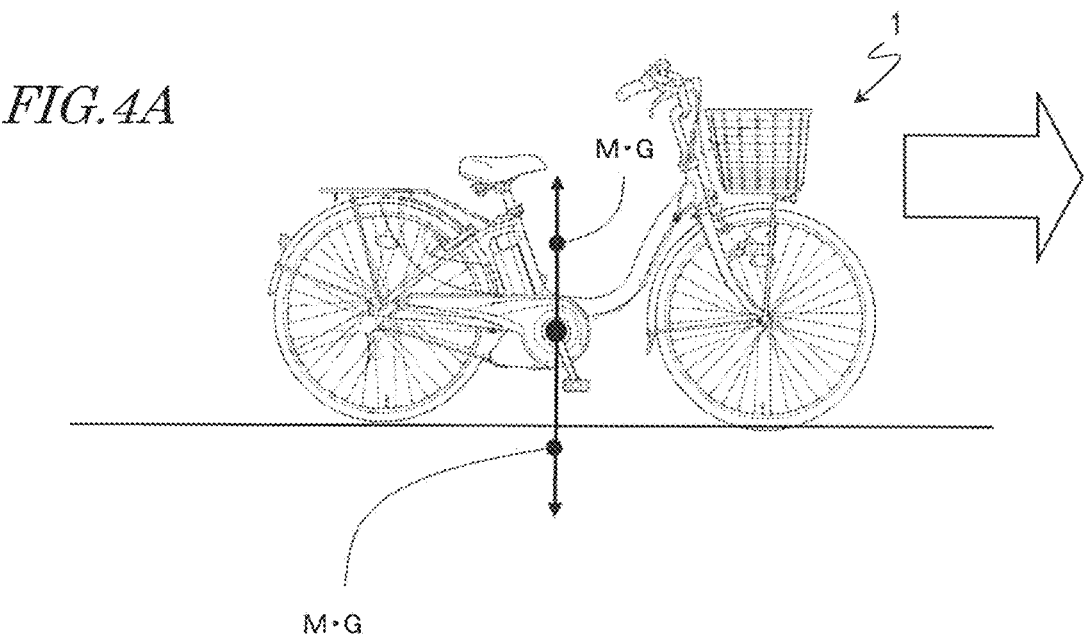
FIG. 4A is a static load correlation diagram of the electric assist bicycle 1 on a flat road.
Figure 4B:
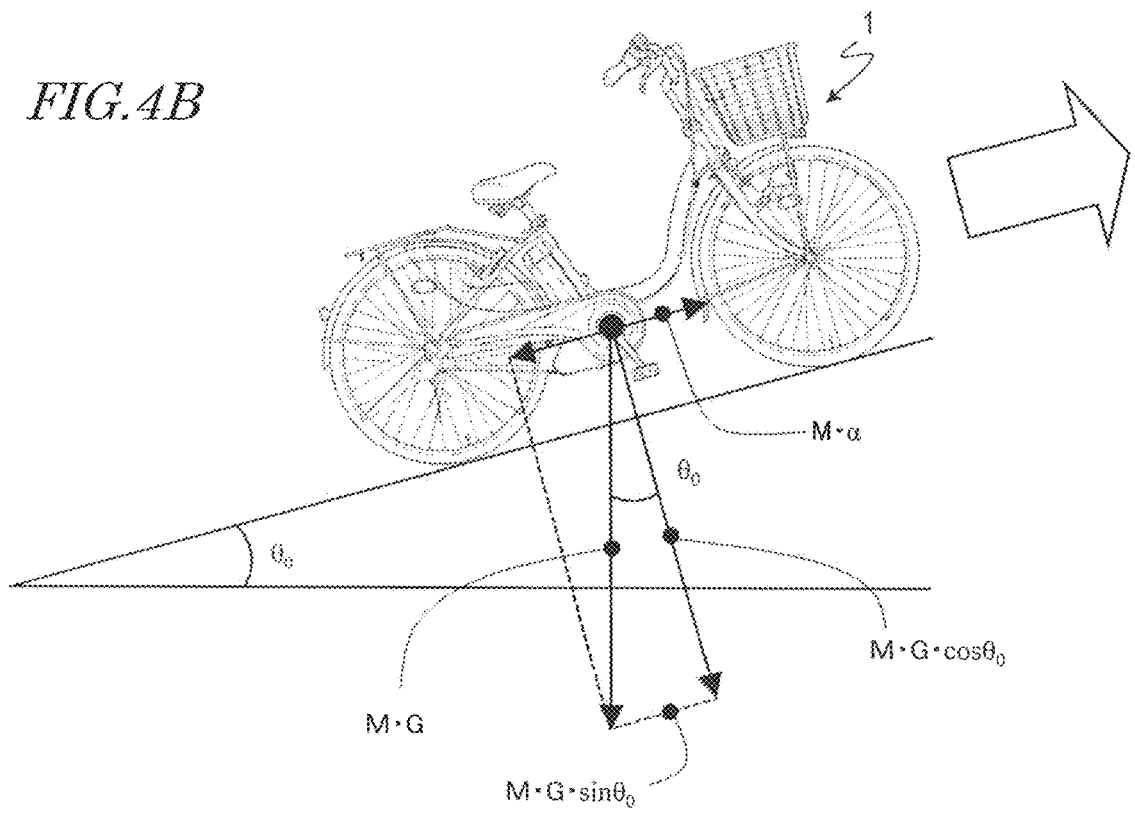
FIG. 4B is a static load correlation diagram of the electric assist bicycle 1 on a slope having an inclination angle θ.

FIG. 4A is a static load correlation diagram of the electric assist bicycle 1 on a flat road. FIG. 4B is a static load correlation diagram of the electric assist bicycle 1 on a slope having the inclination angle θ. In FIGS. 4A and 4B, the mass of the electric assist bicycle 1 is represented by "M", the gravitational acceleration is represented by "G", the acceleration Gx in the X-axis direction is represented by "α", and the inclination angle is represented by "$\theta_0$".

FIG. 4A will be referred to. Where the electric assist bicycle 1 is the point mass that is present at the position of the gravitational center thereof, the gravitational force M·G is applied to the electric assist bicycle 1 in a vertically downward direction. The acceleration sensor 38 is influenced by the gravitational force. Therefore, in the state in which the electric assist bicycle 1 is still, the acceleration sensor 38 detects the gravitational acceleration G acting on the vertically downward direction (e.g., negative direction of the Z-axis direction).

In the state in which the electric assist bicycle 1 is still, the electric assist bicycle 1 receives a drag M·G in a vertically upward direction from the ground, which counteracts the gravitational force M·G in the vertically downward direction. Since the electric assist bicycle 1 is in a still state against the gravitational force, the electric assist bicycle 1 is accelerating upward, in which the gravitational acceleration is counteracted. Namely, the acceleration sensor 38 detects the acceleration G in the vertically upward direction (positive direction of the Z-axis direction).

The situation is the same in FIG. 4B. In the state of being still on a slope, the electric assist bicycle 1 is still against a component, of the gravitational force, in a direction going down the slope (against M·G·sin $\theta_0$). Where the direction going down the slope is negative, the acceleration in this state is −G·sin $\theta_0$. The electric assist bicycle 1 still on the slope is accelerating at a magnitude of G~sin $\theta_0$ in a direction going up the slope so as to counteract the acceleration in the direction going down the slope (so as to counteract G·sin $\theta_0$). Namely, the acceleration is +G·sin $\theta_0$. In consideration of such a relationship, the inclination angle $\theta_0$ is determined by the following expression.

$$\tan\theta_0 = M \cdot G \cdot \sin\theta_0 / M \cdot G \cdot \cos\theta_0$$

$$= \text{(acceleration value in the } X\text{-axis direction)} /$$

(acceleration value in the Z-axis direction)

$$= Gx/Gz$$

In this manner, the inclination angle is determined by the above-described numerical expression (iii). This numerical expression is applicable to determine the inclination angle of the slope immediately after the rider presses the power source switch 65, in the state in which the power of the electric assist bicycle 1 is off, to turn on the power.

As understood from the above description, in the case in which the vehicle is in a still state and the sign of the acceleration Gx is positive, the electric assist bicycle 1 may be determined to be directed upward with respect to the slope, whereas in the case in which the vehicle is a still state and the sign of the acceleration Gx is negative, the electric assist bicycle 1 may be determined to be directed downward with respect to the slope. In general, the rider requires higher assist power when starting pedaling the electric assist bicycle 1 on an ascending slope. The gradient calculation circuit 82 may calculate the inclination angle θ only when the acceleration Gx is of a positive value.

The assist power calculation circuit 83 performs calculations and outputs a control signal in order to rotate the electric motor 53 at an assist ratio in accordance with the inclination angle. In this preferred embodiment, the assist power calculation circuit 83 includes functional blocks that perform a plurality of types of processes. Specifically, the assist power calculation circuit 83 includes an assist ratio determination block 83*a*, a motor electric current command value calculation block 83*b*, and a motor electric current command value correction block 83*c*. Each of the functional blocks may be mounted as a calculation core in the assist power calculation circuit 83, or may be mounted as a sub routine or a library of a computer program.

The assist ratio determination block 83*a* receives data on the inclination angle θ calculated by the gradient calculation circuit 82 and data that specifies the assist mode selected by the rider by use of the operation panel 60, and determines the assist ratio. The "assist ratio" is a ratio of the assist power generated by the electric motor 53 with respect to the crank rotation output that is generated by the human power of the rider applied to the pedal 55. The crank rotation output is a product of the torque generated in the crankshaft 57 by the human power of the rider applied to the pedal 55 and the rotation speed of the crankshaft 57. The assist ratio may also be referred to as a driving assist ratio.

Figure 5A:
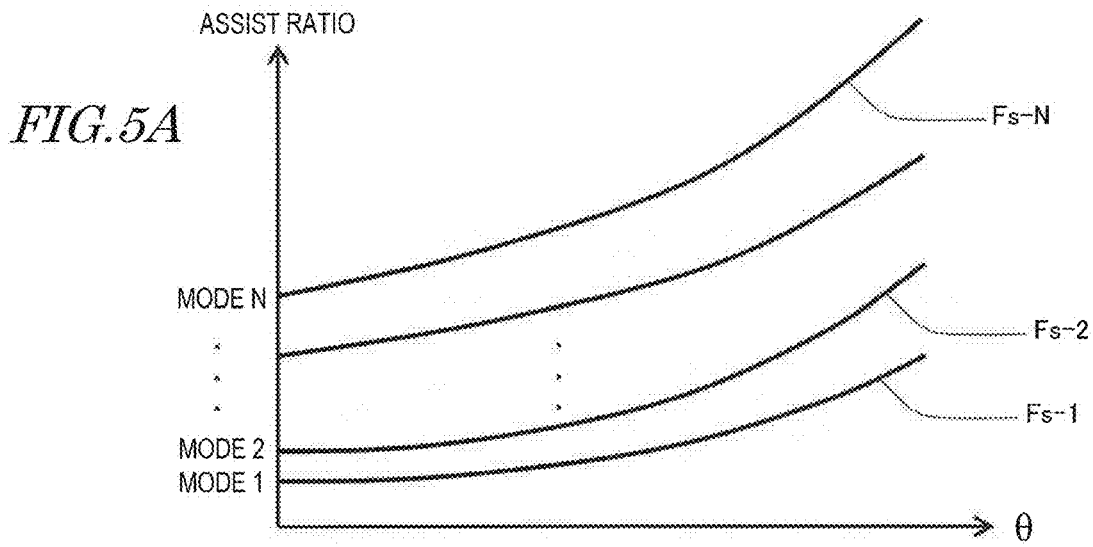
FIG. 5A shows nonlinear functions Fs-1 through Fs-N representing the relationship between the inclination angle θ and the assist ratio in selectable assist modes 1 through N (N: an integer of 2 or greater).

FIG. 5A shows nonlinear functions Fs-1 through Fs-N representing the relationship between the inclination angle θ and the assist ratio in selectable assist modes 1 through N (N: integer of 2 or greater). The relationship between the inclination angle θ and the assist ratio may be represented by a nonlinear function that is different for each of the assist modes. The assist ratio determination block 83*a* stores numerical expression data on each of the functions on a nonvolatile memory (not shown).

The assist ratio determination block 83*a* selects, from such a plurality of pieces of numerical expression data, the numerical expression data corresponding to the assist mode selected by the rider. The assist ratio determination block 83*a* determines the assist ratio corresponding to the inclination angle θ based on the data on the inclination angle θ calculated by the gradient calculation circuit 82.

The relationship between the inclination angle θ and the assist ratio of each assist mode shown in FIG. 5A is applied from when the electric assist bicycle 1 in a stop state is started to be pedaled until a certain condition is fulfilled. The "certain condition" is, for example, "the electric assist bicycle 1 is pedaled 5 times after being started to be pedaled". After the certain condition is fulfilled, an assist ratio determination process applied during normal running may be applied. The assist ratios shown in FIG. 5A are higher than the assist ratio applied during the normal running. The assist ratio determination process applied during the normal running does not need to be determined in accordance with the inclination angle, and may be determined based on only the selected assist mode.

The data stored on the nonvolatile memory of the assist ratio determination block 83a does not need to be the numerical expression data on the nonlinear function. For example, a table showing the value of each of the inclination angles to be output and the corresponding assist ratio may be stored on the nonvolatile memory.

The motor electric current command value calculation block 83b receives a value representing the magnitude of the pedal torque detected by the torque sensor 41, a value representing the magnitude of the rotation speed of the crankshaft 57 detected by the crank rotation sensor 42, and data representing the assist mode selected by the rider, and calculates the electric current command value to flow in the electric motor 53. According to the above-described definition of the assist ratio, the magnitude of the assist power generated by the electric motor 53 is determined by the magnitude of the crank rotation output and the assist ratio applied in accordance with the assist mode selected by the rider. The motor electric current command value calculation block 83b uses the magnitude of the pedal torque detected by the torque sensor 41 and the magnitude of the rotation speed of the crankshaft 57 detected by the crank rotation sensor 42 to acquire the magnitude of the crank rotation output.

The motor electric current command value calculation block 83b further receives speed data from the speed sensor 35. A reason for this is that in Japan, when the vehicle speed is a predetermined value or higher (e.g., 10 km per hour or higher), the assist power of the electric assist bicycle 1 is regulated to be decreased. The motor electric current command value calculation block 83b also receives data representing a transmission gear range of the transmission mechanism included in the power transmission mechanism 31. In the case in which, for example, the current transmission gear range is a low gear range that is lower than, or equal to, a predefined range, the motor electric current command value calculation block 83b may set the electric current to flow in the electric motor 53 to be lower. With such a structure, the magnitude of the assist power generated by the electric motor 53 is suppressed low, and thus the electric assist bicycle 1 is prevented from jumping out.

The motor electric current command value calculation block 83b acquires the rotation speed or the number of rotations per unit of time of the electric motor 53 based on the output signal of the Hall sensor 46. A reason for this is that in order to cause the electric motor 53 to generate desired assist power, the motor electric current command value calculation block 83b needs to learn the current rotation speed or the current number of rotations per unit of time.

The motor electric current command value calculation block 83b generates a command value for the motor electric current required to generate required assist power, and transmits the command value to the motor electric current command value correction block 83c.

The motor electric current command value correction block 83c receives the assist ratio determined by the assist ratio determination block 83a and the command value for the motor electric current generated by the motor electric current command value calculation block 83b. The motor electric current command value correction block 83c determines whether or not the assist power to be generated by the command value of the motor electric current matches the received assist ratio. For this determination, the magnitude of the crank rotation output needs to be acquired. Therefore, the motor electric current command value correction block 83c uses the magnitude of the pedal torque detected by the torque sensor 41 and the magnitude of the rotation speed of the crankshaft 57 detected by the crank rotation sensor 42.

In the case in which as a result of the determination, the assist power does not match the received assist power, the motor electric current command value correction block 83c corrects the motor electric current command value such that the assist power matches the received assist ratio, and outputs the correct command value to the motor driving circuit 85.

As a result of the above-described process, the assist power calculation circuit 83 causes the electric motor 53 to rotate at the assist ratio in accordance with the inclination angle to obtain the required assist power.

There may be various relationships between the inclination angle θ and the assist ratio, based on which the assist ratio determination block 83a determines the assist ratio. Hereinafter, a plurality of examples will be described.

Figure 5B:
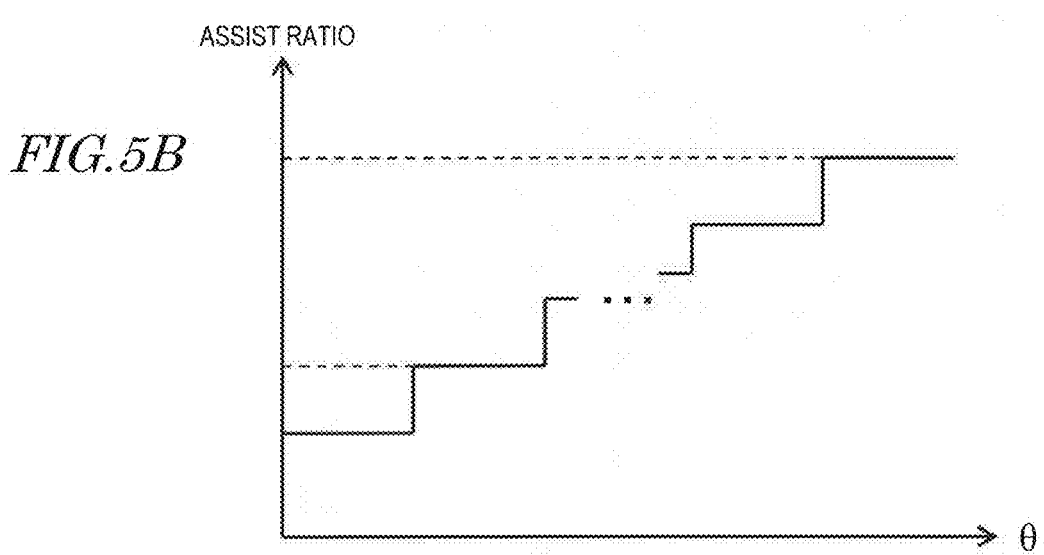
FIG. 5B shows a second example of the relationship between the inclination angle θ and the assist ratio.
Figure 5C:
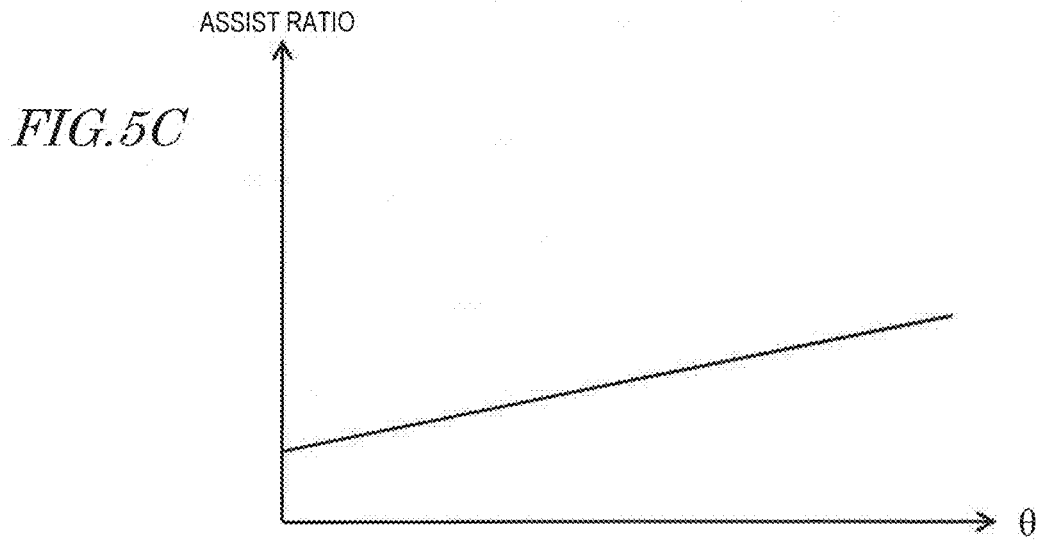
FIG. 5C shows a third example of the relationship between the inclination angle θ and the assist ratio.

FIG. 5B shows a second example of the relationship between the inclination angle θ and the assist ratio. In the second example, the relationship between the inclination angle θ and the assist ratio is represented by a staircase-like function. FIG. 5C shows a third example of the relationship between the inclination angle θ and the assist ratio. In the third example, the relationship between the inclination angle θ and the assist ratio is represented by a linear function. Either one of the functions is usable instead of the nonlinear function provided for each of the plurality of assist modes shown in FIG. 5A.

Figure 6:
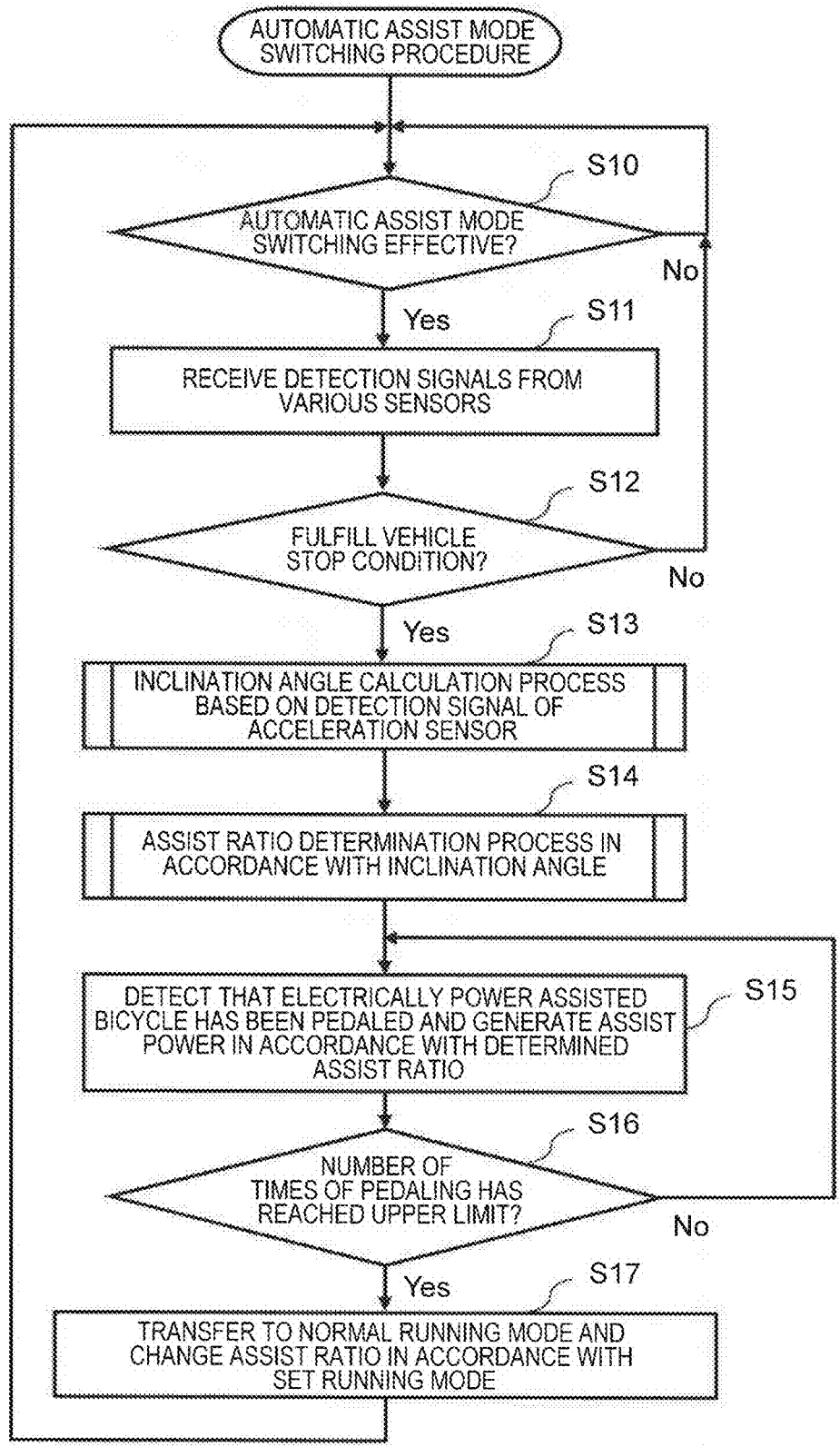
FIG. 6 is a flowchart showing a procedure of a process performed by a driving unit 51 of the electric assist bicycle 1.

FIG. 6 is a flowchart showing a procedure of a process performed by the driving unit 51.

In step S10, the controller 70 determines whether or not automatic assist mode switching is effective. Only when the automatic assist mode switching is effective, the controller 70 advances the procedure to the next step S11. The process performed in the case in which the determination result is "No" in step S10 is set with an assumption that the rider fixes the assist mode. In such a case, it is not necessary to operate the electric assist bicycle 1 against the will of the rider. A mode in which the automatic assist mode switching is effective, and a mode in which automatic assist mode switching is ineffective, may be switched to each other by a hardware button or software. In the latter case, for example, the power source button 65 may be held down to determine whether or not the electric assist bicycle 1 is in a lock mode, in which the assist mode switching is prohibited. Instead of, or in addition to, determining whether or not the automatic assist mode switching is effective, the electric assist bicycle 1 may be set such that a mode in which the assist ratio change is permitted in accordance with the inclination angle, and a mode in which the assist ratio change is not permitted, may be switchable to each other. Such modes may be switched to each other by a hardware button or software.

In step S11, the assist power calculation circuit 83 of the controller 70 receives detection signals from various sensors, for example, from the speed sensor 35, the torque sensor 41 and the crank rotation sensor 42.

In step S12, the stop detection circuit 81 determines whether or not the vehicle stop condition is fulfilled. In the case in which vehicle stop condition is fulfilled, the procedure advances to step S13. In the case in which the vehicle stop condition is not fulfilled, the procedure returns to step S10.

In step S13, the gradient calculation circuit 82 calculates the inclination angle based on the detection signal of the acceleration sensor 38. The calculation of the inclination angle is performed based on any of expressions (i) through (iii) described above.

In step S14, the assist power calculation circuit 83 performs the assist ratio determination process in accordance with the inclination angle.

In step S15, upon detecting that the electric assist bicycle 1 is pedaled based on the detection signals from the torque sensor 41, the crank rotation sensor 42 and the like, the assist power calculation circuit 83 causes the assist power to be generated in accordance with the determined assist ratio.

In step S16, the assist power calculation circuit 83 determines whether or not the number of pedaling has reached an upper limit thereof. The upper limit is, for example, 5 times. When either one of the pedals 55 reaches a bottom dead center, it may be counted that the electric assist bicycle 1 is pedaled once. In the case in which the number of pedaling has reached the upper limit, the procedure advances to step S17. In the case in which the number of pedaling has not reached the upper limit, the procedure returns to step S15. The assist power calculation circuit 83 keeps on transmitting a control signal to the motor driving circuit 85 such that the assist power in accordance with the determined assist ratio is generated.

In step S17, the driving unit 51 is transferred from the assist mode that is applied when the electric assist bicycle 1 is started on a slope, more specifically, the assist mode in which the assist ratio is higher, to the normal running mode. Specifically, the assist power calculation circuit 83 changes the assist ratio used so far to the assist ratio in accordance with the set running mode. Then, the procedure returns to step S10.

In step S13 described above, the gradient calculation circuit 82 calculates the inclination angle θ in the state in which the vehicle is in a stop state. Therefore, there is less noise overlapping the detection signals of the acceleration sensor 38, as compared with the case in which the electric assist bicycle 1 is running. Therefore, the gradient calculation circuit 82 calculates the inclination angle θ at higher precision. Since the angle is detected by the acceleration sensor 38, it is not necessary to provide a gyrosensor or, for example, a calculation circuit for angle calculation, which is more costly, to calculate the angle. Therefore, the structure is simplified, the number of various components is decreased, and the space in which the components are installed is decreased. As a result, the production cost of the driving unit 51 is decreased, and therefore, the production cost of the electric assist bicycle 1 is decreased.

In step S16 described above, the upper limit of the number of pedaling is described as being, for example, 5 times. This numerical value is merely an example. The upper limit of the number of pedaling may be less than 5 times or more than 5 times. The upper limit of the number of pedaling may be 3 times or 7 times. The upper limit of the number of pedaling may be set to 5 and may be changed in accordance with the magnitude of the inclination angle. For example, as the inclination angle is larger, the upper limit may be increased to 3 times, 4 times and then 5 times. As the inclination angle is smaller, the upper limit may be decreased to 3 times and then 2 times.

In step S17, if the electric assist bicycle 1 is rapidly transferred from the assist mode that is applied when the electric assist bicycle 1 is started on a slope, more specifically, the assist mode in which the assist ratio is relatively high, to the normal running mode, in which the assist ratio is relatively low, the rider may possibly feel uncomfortable. The assist power calculation circuit 83 may change the assist mode such that the assist ratio keeps on changing by a predefined change amount.

As the predefined change amount is smaller, the assist ratio is changed smoothly, and it is less possible that the rider feels uncomfortable.

So far, a technology of increasing the assist ratio relatively when the electric assist bicycle 1 is to run up the slope from the state of being at a stop on the slope has been described. The assist ratio may be changed when the electric assist bicycle 1 is to run down the slope. It should be noted that when the electric assist bicycle 1 is to run down the slope, the assist ratio may be set to lower than that in the normal running mode to decrease the assist power.

Figure 7:
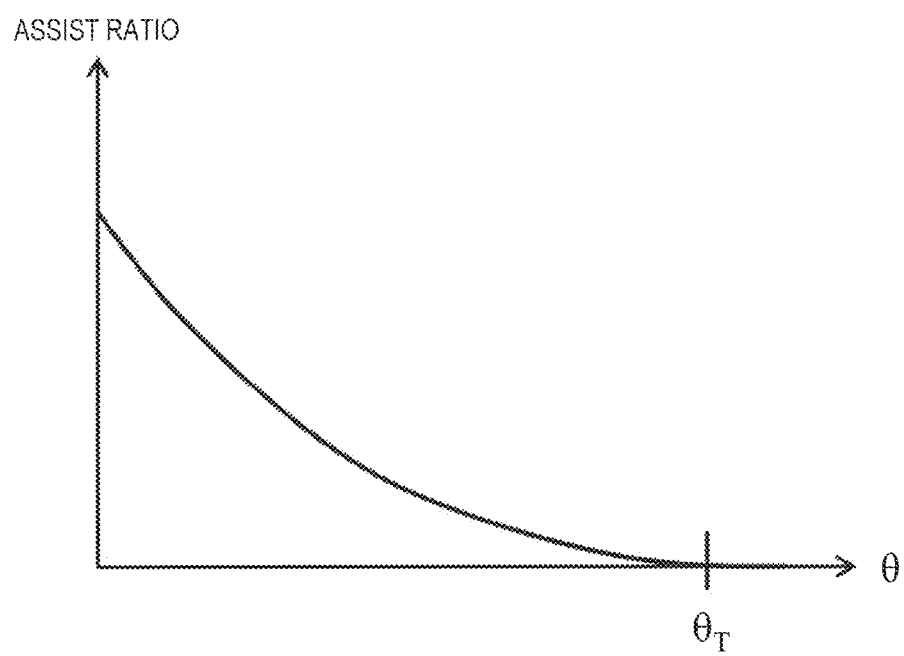
FIG. 7 shows an example of nonlinear function, showing the relationship between the inclination angle θ and the assist ratio, that is applicable when the electric assist bicycle 1 is to run down the slope.

FIG. 7 shows an example of a nonlinear function, representing the relationship between the inclination angle θ and the assist ratio, that is applicable when the electric assist bicycle 1 is to run down the slope. When the electric assist bicycle 1 is to run down the slope, as the inclination angle is larger, the assist ratio may be decreased. A reason for this is that the pedal force that is required when the rider starts pedaling is small. When the inclination angle becomes a predefined angle $θ_τ$ or larger, (e.g., 3 degrees or larger), the assist ratio may be made zero to stop the generation of the assist power by the electric motor 53.

Figure 8A:
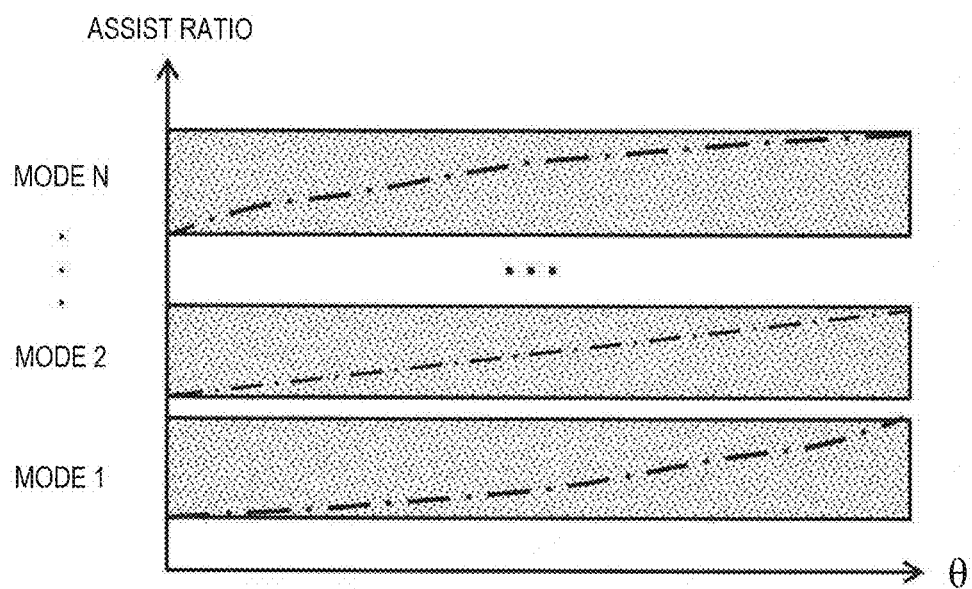
FIG. 8A shows the relationships between the inclination ratio θ and the assist ratio when the electric assist bicycle 1 is to run up a slope.
Figure 8B:
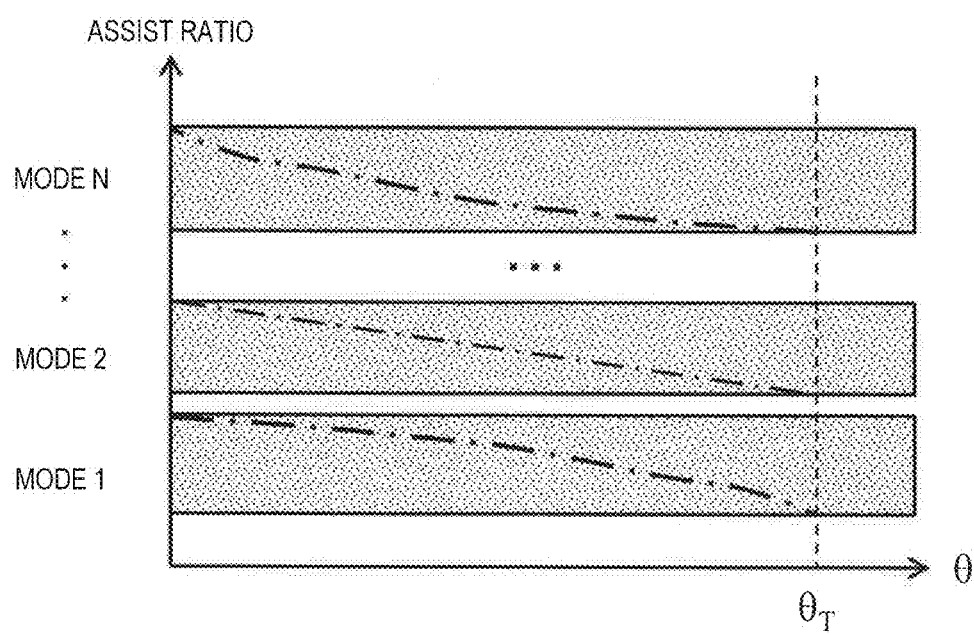
FIG. 8B shows the relationships between the inclination ratio θ and the assist ratio when the electric assist bicycle 1 is to run down the slope.

FIGS. 8A and 8B each show an example of relationship between the inclination angle θ and the assist ratio for each of the assist modes, by which the assist ratio may have some width. The width of the assist ratio that may be allocated to each of the assist modes is shown in the form of a band for the corresponding assist mode. FIG. 8A shows the relationships between the inclination ratio θ and the assist ratio when the electric assist bicycle 1 is to run up a slope. FIG. 8B shows the relationships between the inclination ratio θ and the assist ratio when the electric assist bicycle 1 is to run down the slope.

In the examples shown in FIG. 8A, in assist mode 1, the relationship between the inclination angle θ in the upward direction and the assist ratio is set as a nonlinear function protruding downward. In assist mode 2, the relationship between the inclination angle θ in the upward direction and the assist ratio is set as a linear function. In assist mode N, the relationship between the inclination angle θ in the upward direction and the assist ratio is set as a nonlinear function protruding upward. In each of the examples, in the case in which the inclination angle θ is an elevation angle in the travel direction of the electric assist bicycle 1, as the inclination angle is larger, higher assist power is generated by the electric motor 53 at the start of pedaling. It should be noted that, as is clear from FIG. 8A, even though the inclination angle (elevation angle) θ is increased, there is an upper limit on the assist ratio corresponding to the inclination angle θ. Therefore, there is also an upper limit on the assist power to be generated.

In the examples shown in FIG. 8B, in assist mode 1, the relationship between the inclination angle θ in the downward direction and the assist ratio is set as a nonlinear function protruding upward. In assist mode 2, the relationship between the inclination angle θ in the downward direction and the assist ratio is set as a linear function. In assist mode N, the relationship between the inclination angle θ in the downward direction and the assist ratio is set as a nonlinear function protruding downward. In each of the examples, in the case in which the inclination angle θ is a declination angle in the travel direction of the electric assist bicycle 1, as the inclination angle is larger, lower assist power is generated by the electric motor 53 at the start of pedaling. It should be noted that when the inclination angle is $θ_τ$ or larger, the assist ratio is made zero, and therefore, no assist power is generated. Namely, even though the inclination angle (declination angle) θ is increased, the assist ratio is zero when the inclination angle is a certain angle $θ_τ$ or larger. Therefore, it may be considered that there is a lower limit on the assist power to be generated.

In the examples shown in FIGS. 8A and 8B, there is a width for the assist ratio. With such a structure, unless the assist ratio reaches the upper limit or the lower limit, an assist ratio higher or lower than the current assist ratio may always be set. For example, it is assumed that the current assist mode is set to "high" (FIG. 3), at which the assist power is highest, and that the upper limit on the assist ratio in this case is "2". In the case in which the current assist ratio is "1.5", the assist ratio may be made "1.6" or "1.9" in accordance with the magnitude of a certain inclination angle $θ_a$.

Alternatively, the change amount of the assist ratio may be varied in accordance with the assist mode. For example, in the case in which the inclination angle is a certain angle $θ_b$, the current assist ratio of "1.5" may be changed to "1.7" for the assist power of "high", the current assist ratio of "1.0" may be changed to "1.15" for the assist power of "low", and the current assist ratio of "0.8" may be changed to "0.9" for the assist power of "ecological".

Preferred Embodiment 2

In preferred embodiment 1, the electric assist bicycle that calculates the inclination angle while being at a stop and generates assist power in accordance with the magnitude of the inclination angle is described.

An electric assist bicycle according to illustrative preferred embodiment 2 calculates the inclination angle of the road surface with high precision regardless of whether the electric assist bicycle is at a stop or is running, and generates assist power in accordance with the magnitude of the inclination angle. The electric assist bicycle realized by such a structure generates appropriate assist power by the sense of the rider. The electric assist bicycle uses the speed and the acceleration thereof to calculate the inclination angle of the road surface. Hereinafter, this will be described specifically.

Figure 9:
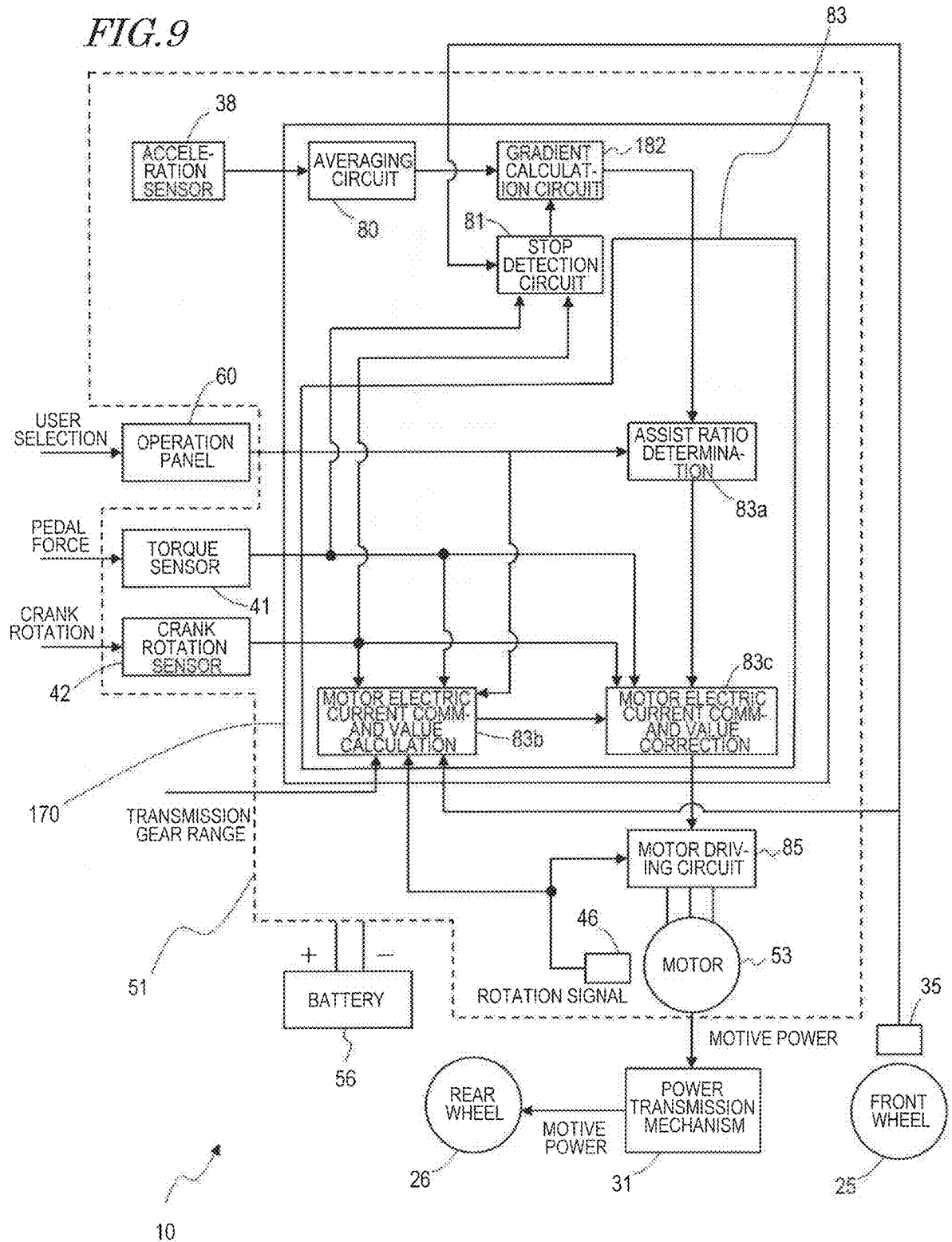
FIG. 9 is a hardware block diagram mainly showing a structure of a controller 170.

FIG. 9 is a hardware block diagram mainly showing a structure of a controller 170 of an electric assist bicycle 10 according to this preferred embodiment. The electric assist bicycle 10 is different from the electric assist bicycle 1 in the contents of process performed by the gradient calculation circuit included in the controller. Hereinafter, a gradient calculation circuit 182 included in the electric assist bicycle 10 will be described in detail.

The electric assist bicycle 10 has an external appearance same as that of the electric assist bicycle 1 shown in FIG. 1. Among the elements shown in FIG. 9, the elements other than the elements specifically described below each have substantially the same structure as, and operate in substantially the same manner as, the corresponding element of the electric assist bicycle 1 shown in FIG. 2. For such a common structure and such a common operation, the description in preferred embodiment 1 will be incorporated and will be not be provided again. As shown in FIG. 9, the detection signals of the acceleration sensor 38 are transmitted to the gradient calculation circuit 182 after being processed by the averaging circuit 80. Hereinafter, for the sake of convenience, the gradient calculation circuit 182 will be described as receiving the detection signals from the acceleration sensor 38, and the averaging circuit 80 will not be described.

The gradient calculation circuit 182 calculates the gradient (inclination angle) θ of the current position of the electric assist bicycle 10 by use of a detection signal, among the detection signals output from the acceleration sensor 38, that represents the acceleration in the travel direction. According to the structure of this particular preferred embodiment, the acceleration sensor may be a monoaxial sensor that detects only the acceleration in the travel direction. As compared with an acceleration sensor capable of outputting accelerations in a plurality of axial directions, such a monoaxial acceleration sensor is available at lower cost.

The timing at which the gradient calculation circuit 182 calculates the inclination angle θ is arbitrary. The gradient calculation circuit 182 may calculate the inclination angle θ while the electric assist bicycle 1 is running or at a stop. The gradient calculation circuit 182 may calculate the inclination angle θ constantly or once in a certain time interval, for example, every 2 or 3 seconds. In the case in which the time interval at which the calculation is performed is longer, the calculation load is alleviated, and thus the power consumption of the battery 56 is decreased. However, in the case in which the time interval is too long, it takes a long time to update the inclination angle, and therefore, it may require some time to provide the assist power in accordance with the inclination angle and the human power.

A method for calculating the inclination angle θ by the gradient calculation circuit 82 will be described.

Figure 10A:
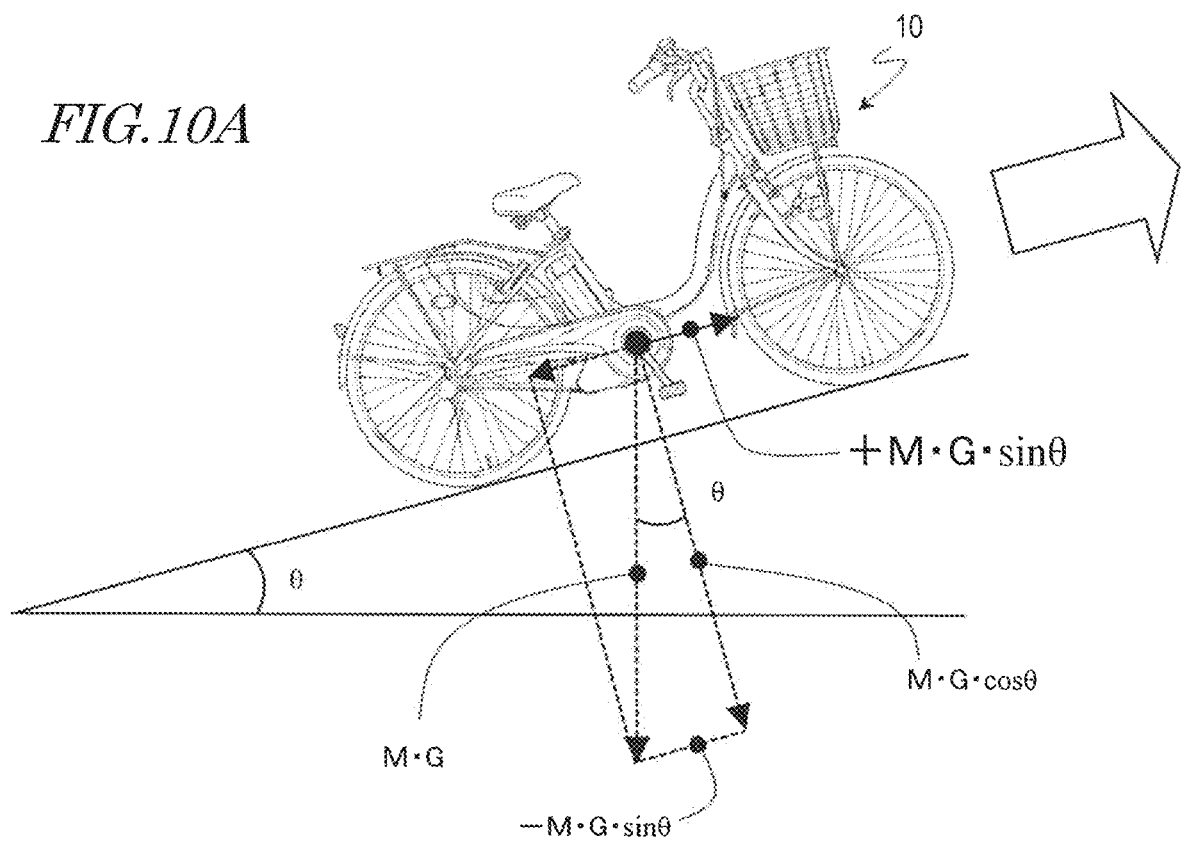
FIG. 10A is a static load correlation diagram of an electric assist bicycle 10 with an assumption that the electric assist bicycle 10 is in a still state on a slope having an inclination angle θ.

FIG. 10A is a static load correlation diagram of the electric assist bicycle 10 with an assumption that the electric assist bicycle 10 is in a still state on a slope having an inclination angle θ. In FIG. 10A, the mass of the electric assist bicycle 10 is represented by "M", the gravitational acceleration is represented by "G", and the inclination angle is represented by "θ".

As described above in preferred embodiment 1 with reference to FIG. 4B, in the state in which the electric assist bicycle 10 is in a still state on a road surface having the inclination angle θ, a force against a component, of the gravitational force, in a direction going down the slope (force against −M·G·sin θ) is applied to the electric assist bicycle 10. The force has a magnitude of M·G·sin θ in the direction going up the slope (direction of the solid arrow in the figure) (in FIG. 10A, represented as "+M·G·sin θ"). In this state, the acceleration sensor 38 of the electric assist bicycle 10 outputs an acceleration signal of +G·sin θ in the direction going up the slope.

Figure 10B:
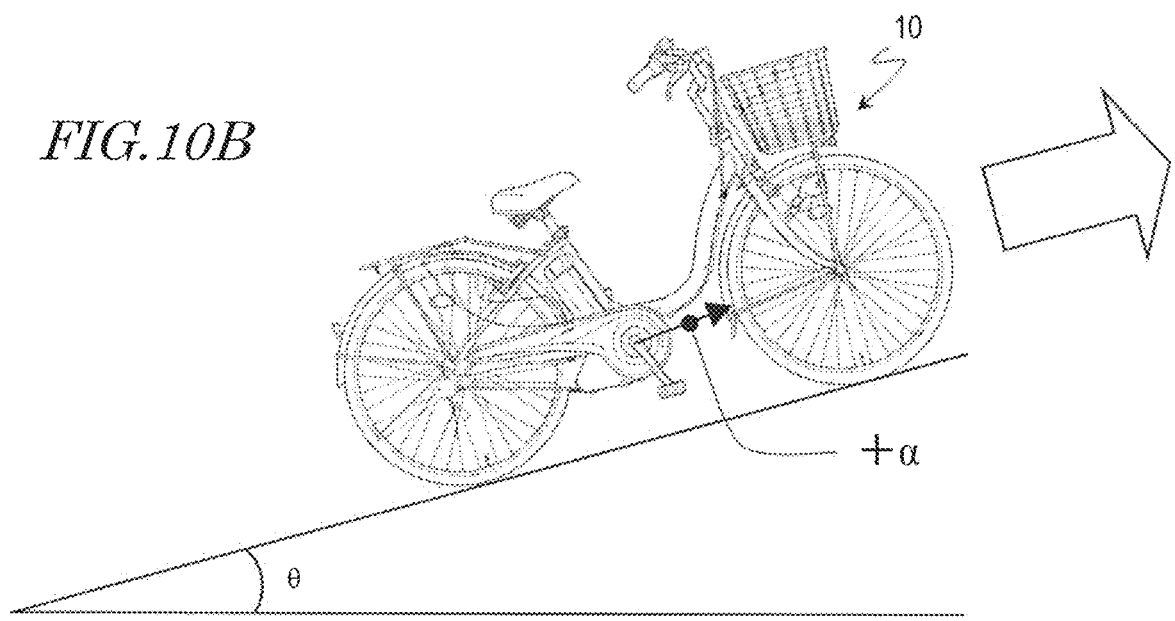
FIG. 10B shows that an acceleration sensor 38 of the electric assist bicycle 1 running on a slope outputs an acceleration signal of "+α".

FIG. 10B indicates that the acceleration sensor 38 of the electric assist bicycle 10 running on the slope outputs an acceleration signal of "+α".

Regarding the direction going up the slope, as described above, even while the electric assist bicycle 10 is in a still state, the acceleration sensor 38 outputs an acceleration signal of +G·sin θ. Therefore, the acceleration signal "+α" shown in FIG. 10B is considered to include a running acceleration β while the electric assist bicycle 10 is actually running in the direction of the slope with an acceleration and the acceleration signal of +G·sin θ. The relationship among α, β and sin θ is as represented by expression (1).

$$\alpha = \beta + G \cdot \sin \theta \quad (1)$$

As a result, the inclination angle θ is determined by expression (2).

$$\theta = \sin^{-1}\{(\alpha - \beta)/G\} \quad (2)$$

In expression (2), "+α" is obtained as the acceleration Gx that is output from the acceleration sensor 38. The actual acceleration β of the electric assist bicycle 10 is obtained by, for example, time-differential operation of the vehicle speed V of the electric assist bicycle 10. The vehicle speed V may be detected by use of the speed sensor 35. Expression (2) is represented more generally as expression (3). The gravitational acceleration G is about 9.8 (m/s$^2$), and is a constant.

$$\theta = \sin^{-1}\{(Gx - dV/dt)/G\} \quad (3)$$

The gradient calculation circuit 182 of the controller 170 performs the calculation in the middle parentheses in the right side of expression (3) and performs inverse sine transformation on the calculation result to determine the inclination angle θ. Specifically, the gradient calculation circuit 182 acquires the acceleration Gx, required for the calculation, from the acceleration sensor 38. The gradient calculation circuit 182 also receives the speed data from the speed sensor 35 to detect the vehicle speed V. The "speed data" may be data representing the value of the vehicle speed V, or may be a vehicle speed pulse signal to be used to calculate the vehicle speed.

An example of process of detecting the vehicle speed by use of the vehicle speed pulse signal will be described. The speed sensor 35 may be a 1-pulse vehicle speed sensor including, for example, a Hall sensor. The front wheel 25 is provided with one magnet. When the magnet rotates along with the rotation of the front wheel 25, the Hall element detects a magnetic field of the magnet and outputs one pulse signal each time the front wheel 25 rotates once. The gradient calculation circuit 182 divides the circumferential length L (known) of the front wheel 25 by the time interval T at which two continuous pulses are obtained, and thus detects the vehicle speed V. The above-described number of pulse that is output each time the front wheel 25 rotates once is merely an example. The number of pulses may be, for example, 2, 4, 24, or 30. Where the number of pulses that are output each time the front wheel 25 rotates once is N, the vehicle speed V may be determined by V=L(N·T). The speed sensor 35 may be provided on the rear wheel 26. Namely, the speed sensor 35 may be provided on either one of the wheels.

Figure 11A:
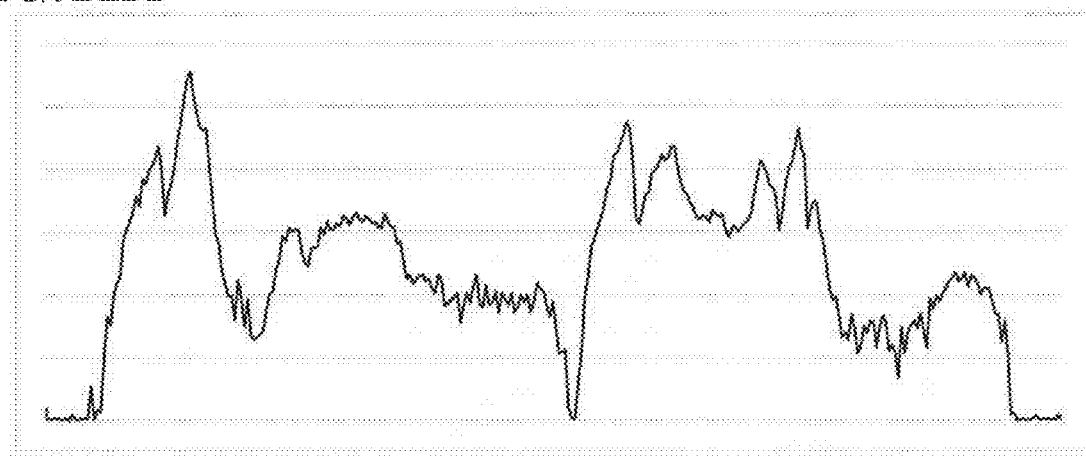
FIG. 11A is a graph showing a change in the vehicle speed V of the electric assist bicycle 10.
Figure 11B:
FIG. 11B is a graph showing a change in the acceleration Gx in a travel direction of the electric assist bicycle 10.
Figure 11C:
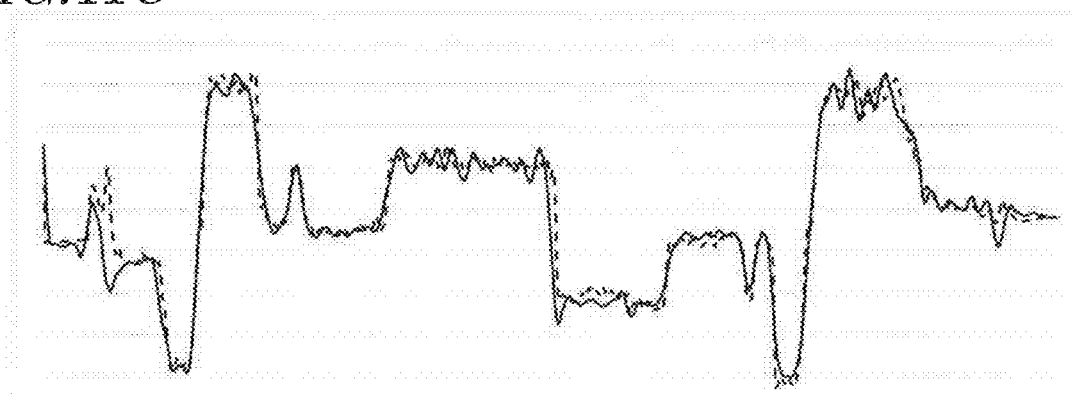
FIG. 11C shows a graph of the estimated inclination angle of the road surface (solid line) and a graph of the actually measured inclination angle of the road surface (dashed line).

With reference to FIGS. 11A through 11C, which show the results of actual measurement performed by the present inventor, it will be described that the inclination angle θ calculated (estimated) by the above-described process has high precision.

FIG. 11A is a graph showing a change in the vehicle speed V of the electric assist bicycle 10. The present inventor measured the vehicle speed by use of a 24-pulse vehicle sensor. FIG. 11B is a graph showing a change in the acceleration Gx in the travel direction of the electric assist bicycle 10.

FIG. 11C shows a graph of the estimated inclination angle of the road surface (solid line) and a graph of the actually measured inclination angle of the road surface (dashed line). The inclination angle was estimated by substituting the acceleration obtained from the time differential of the vehicle speed V and the acceleration Gx into expression (3). As understood from FIG. 11C, the graph of the estimated inclination angle and the graph of the actually measured inclination angle generally match each other except for a portion of the zone. The process according to this preferred embodiment is considered to provide an estimation of the inclination angle with sufficiently high precision.

The assist ratio determination block 83a of the controller 170 receives data on the inclination angle θ calculated by the gradient calculation circuit 82 and data that specifies the assist mode selected by the rider by use of the operation panel 60, and determines the assist ratio. The method for determining the assist ratio is substantially the same as that in preferred embodiment 1. The assist ratio determination block 83a may select, from a plurality of pieces of numerical expression data, the numerical expression data corresponding to the assist mode selected by the rider. The assist ratio determination block 83a determines the assist ratio corresponding to the inclination angle θ based on the data on the inclination angle θ calculated by the gradient calculation circuit 82.

In this preferred embodiment also, the relationship between the inclination angle θ and the assist ratio for each of the assist modes as shown in FIGS. 5A through 5C may be defined. The assist ratio determination block 83a may apply the determined assist ratio until the estimated value of the inclination angle θ is updated next time.

Figure 12:
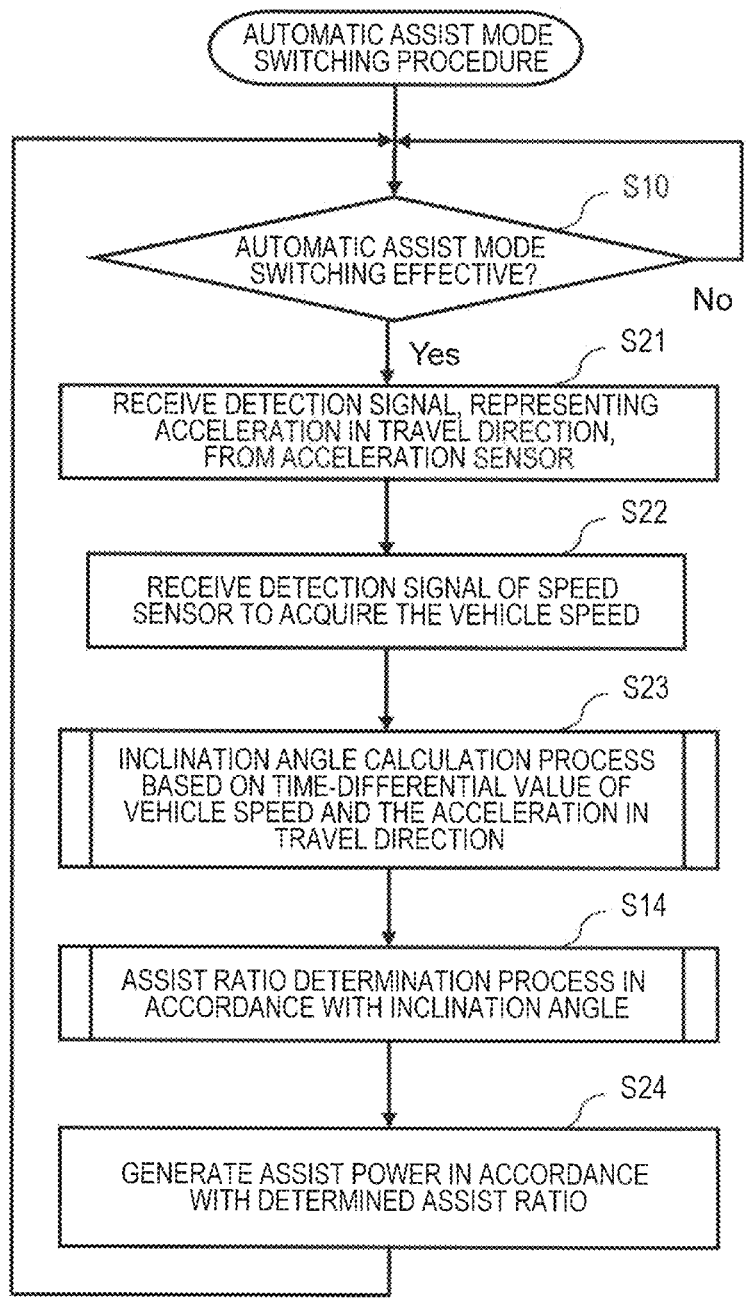
FIG. 12 is a flowchart showing a procedure of a process performed by the driving unit 51 of the electric assist bicycle 10.

FIG. 12 is a flowchart showing a procedure of the process performed by the driving unit 51 of the electric assist bicycle 10. In FIG. 12, the same steps as those in FIG. 6 bear the identical numbers thereto. Regarding the contents of the steps described above, the description in preferred embodiment 1 will be incorporated. As shown in FIG. 9, the driving unit 51 according to this preferred embodiment includes the controller 170, the acceleration sensor 38, the electric motor 53, the motor driving circuit 85, the Hall sensor 46 and the like.

In step S21, the gradient calculation circuit 182 receives, from the acceleration sensor 38, a detection signal representing the acceleration in the travel direction. In step S22, the gradient calculation circuit 182 receives a detection signal of the acceleration sensor 38 to acquire the vehicle speed V. The order of step S21 and step S22 may be opposite to the above.

In step S23, the gradient calculation circuit 182 performs the calculation of expression (3) to determine the inclination angle θ.

In step S24, the assist power calculation circuit 83 generates the assist power in accordance with the determined assist ratio.

As a result of the above-described process, the controller 170 causes the electric motor 53 to generate the assist power of a magnitude in accordance with the estimated inclination angle. In the case in which, for example, there is a slope having an inclination angle θ larger than 0, namely, a slope ascending in the travel direction, the assist power is increased as the inclination angle θ is larger. With such a structure, the human power of the rider is assisted properly on the ascending slope, where the rider feels that the load is heavier. In the case in which there is a slope having an inclination angle θ smaller than 0, namely, a slope descending in the travel direction, the assist power is decreased as the absolute value of the inclination angle θ is larger. With such a structure, generation of high assist power on the descending slope is suppressed, and thus acceleration on the descending slope is suppressed.

In the case in which the process according to this preferred embodiment is performed while the electric assist bicycle 10 is going up or down a slope, the power consumption of the battery 56 is larger than by the conventional process because the assist power is increased on the ascending slope. However, on the descending slope, the controller 170 immediately decreases the assist power upon detecting that the slope is descending. With such a structure, the power consumption of the battery 56 is suppressed more than by the conventional process. Therefore, the power consumption of the battery 56 is about the same as by the conventional process while the level of comfort of the rider is improved. The magnitude of the post-suppression assist power is typically zero.

According to this preferred embodiment, the inclination angle is determined with sufficiently high precision even if the speed sensor 35 and the acceleration sensor 38 have a relatively low cost. Since it is not necessary to use a gyrosensor or a calculation circuit for angle calculation, which is costly, the production cost of the electric assist bicycle 10 is suppressed from increasing.

The method for calculating the inclination angle θ is not limited to using expression (3). The gradient calculation circuit 82 may calculate sin θ shown in expression (4).

$$\sin \theta = (Gx - dV/dt)/G \quad (4)$$

In order to acquire the inclination angle from expression (4), a table correlating each of a plurality of angles and a calculated value of the sine function corresponding to each of the angles is prepared and is stored in, for example, an inner buffer (not shown) of the gradient calculation circuit 182. The gradient calculation circuit 182 refers to the table by use of the calculation result of the right side of expression (4) to acquire one angle. The gradient calculation circuit 82 detects the angle as the inclination angle.

In the above-described example of expression (3), the gradient calculation circuit 182 determines the vehicle speed V by use of the output of the speed sensor 35. Hereinafter, other examples (modifications) of calculating the vehicle speed V will be described.

Modification 1 of the Method for Calculating the Vehicle Speed V

Under a certain condition, the vehicle speed V may be determined from the rotation of the electric motor 53. As described above, the Hall sensor 46 may be used to determine the rotation speed of the electric motor 53. The gradient calculation circuit 182 may use a voltage signal that is output from the Hall sensor 46 to determine the rotation speed of the electric motor 53. In the case in which the electric assist bicycle 10 does not include the speed sensor 35, or even in the case in which the speed sensor 35 is out of order, the vehicle speed V is determined.

The following expression (5) represents the relationship between the rotation speed ω of the electric motor 53 and the vehicle speed V in the electric assist bicycle 10, in which the rear wheel 26 is a driving wheel and which includes a transmission mechanism allowing the transmission gear range to be selected.

$V$ = (rotation speed $\omega$) × (gear ratio in the driving unit 51) ×

(gear ratio of the transmission gear range currently selected) ×

(circumferential length of the rear wheel).

In the right side of expression (5), the gear ratio in the driving unit 51 and the circumferential length of the rear wheel are known. By contrast, the transmission gear range is selected by the rider each time, and thus is unknown. One of the following conditions may be added to determine the vehicle speed V from the rotation speed ω of the electric motor 53.

A first condition is that there is no transmission gear range in the electric assist bicycle 10. Under the first condition, it is not necessary to provide the term regarding the "transmission gear range", and a constant value corresponding to the "transmission gear range" may be set. As a result, the right side of expression (5) may be simplified to a product of the rotation speed ω and the constant.

A second condition is that the transmission mechanism includes a detection mechanism that detects the transmission gear range currently selected and that the gear ratio of each of the transmission gear ranges that may be selected is known. As described above in preferred embodiment 1, the motor electric current command value calculation block 83*b* is capable of receiving data representing the transmission gear range of the transmission mechanism included in the power transmission mechanism 31. The gradient calculation circuit 182 may receive the data representing the transmission gear range, so that the selected transmission gear range is learned.

Under the second condition, a table showing the correlation between each of the transmission gear ranges and the gear ratio is stored in advance on the gradient calculation circuit 182. The gradient calculation circuit 182 may refer to the table by use of the data representing the transmission gear range to determine the gear ratio of the transmission gear range currently selected. The acquired information on the gear ratio may be substituted into expression (5), so that the vehicle speed V is acquired from the rotation speed ω of the electric motor 53 at this point.

A requirement that the detection value of the pedal torque is a threshold value or higher may be added to each of the first condition and the second condition. A reason for this is that under each of the first condition and the second condition described above, there is a case in which the running speed becomes zero although the electric assist bicycle 10 is running, in which case the rider may be confused. For example, Japanese laws and regulations require that the electric motor 53 should stop rotating while the rider is not pedaling the electric assist bicycle 10 on a descending slope or the like. In this case, although it is apparent that the vehicle speed V is not zero, the calculation result of expression (5) may become zero because the rotation speed ω is zero.

For this reason, the requirement that the pedal torque that is output from the torque sensor 41 is larger than a predefined threshold value is added. During the time period in which the rider is not pedaling the electric assist bicycle 10, the pedal torque is the predefined threshold value or lower. During this time period, the gradient calculation circuit 182 does not calculate the vehicle speed V, and as a result, does not calculate the inclination angle. With such a structure, the rider is prevented from being confused. During the time period in which the calculation of the inclination angle is stopped, letters indicating this fact may be displayed on the display panel 61, or an audio signal indicating this fact may be provided in addition to, and/or instead of, the letters, so as to inform the rider of this fact.

In many cases, a one-way clutch (not shown) is provided in a rear hub of the rear wheel 26. A sensor that detects whether or not the one-way clutch is in engagement may be provided, and the gradient calculation circuit 182 may perform the calculation of expression (5) during a time period in which the one-way clutch is detected as being in engagement.

Modification 2 of the Method for Calculating the Vehicle Speed V

There may be a case in which a calculation circuit or a microcontroller different from the gradient calculation circuit 182 uses the detection signal of the speed sensor 35 to perform the process of detecting the vehicle speed V. For example, there is a case in which a microcontroller (not shown) provided in the operation panel 60 performs the process of detecting the vehicle speed V in order to display speed information in the speed display area 61a of the operation panel 60 (FIG. 3). In such a case, the gradient calculation circuit 182 may acquire information representing the vehicle speed V from the microcontroller. In this case, the gradient calculation circuit 182 itself does not need to calculate the vehicle speed V.

Modification 3 of the Method for Calculating the Vehicle Speed V

It is conceivable to use a GPS unit (not shown) capable of acquiring position information by use of the GPS (Global Positioning System). The gradient calculation circuit 182 may constantly acquire position information from the GPS unit provided in the electric assist bicycle 10 and calculate the vehicle speed V based on a change in the position information. In the case in which the GPS unit itself is capable of determining information on the moving speed based on the position information or capable of calculating the speed by use of the Doppler effect of a carrier wave among signal waves radiating from a satellite included in the GPS (GPS satellite), the gradient calculation circuit 182 may receive information on the moving speed that is calculated by the GPS unit and use the information as the information on the vehicle speed V. The above-described calculation on the moving speed is known and will not be described in detail.

The above-described modifications are not mutually exclusive, and a plurality of such modifications are usable together.

Some illustrative preferred embodiments of the present invention have been described so far.

As described above, an illustrative electric power assist system (driving unit 51) according to a preferred embodiment of the present invention usable for an electric assist vehicle (electric assist bicycle 1) includes an electric motor 53 that generates an assist power to assist human power of a rider of the electric assist vehicle; a controller (controller 70, 170) configured or programmed to control a magnitude of the assist power to be generated by the electric motor 53; and an acceleration sensor 38 that outputs an acceleration signal representing an acceleration Gx in a travel direction of the electric assist vehicle. The controller acquires speed information representing a running speed of the electric assist vehicle based on an external signal. The controller determines an inclination angle of a road surface based on the speed information and the acceleration signal, and causes the electric motor 53 to generate an assist power of a magnitude in accordance with the inclination angle.

The controller of the electric power assist system determines the inclination angle ($\theta_0$, $\theta$) of the road surface based on the speed information and the acceleration signal regardless of whether the electric assist vehicle is at a stop or is running, and causes the electric motor 53 to generate the assist power of the magnitude in accordance with the inclination angle.

For example, upon detecting that the slope is ascending, the controller increases the assist power as the inclination angle is larger. With such a structure, the human power of the rider is assisted properly at the start on the ascending slope, when the rider feels that the load is heavier. Upon detecting that the slope is descending, the controller decreases the assist power as the inclination angle is larger. With such a structure, high assist power is not generated on the descending slope, and thus acceleration on the descending slope is suppressed.

On the ascending slope, the assist power is increased. Therefore, the power consumption is larger than by the conventional process. However, on the descending slope, the controller decreases the assist power upon detecting that the slope is descending. Therefore, the power consumption of the battery 56 is suppressed more than by the conventional process on the descending slope. For this reason, the power consumption of the battery 56 is about the same as by the conventional process while the level of comfort of the rider is improved.

The controller uses the acceleration Gx in the first direction as the travel direction and the speed V to determine the inclination angle of the road surface. The acceleration sensor 38 may be a monoaxial sensor for only the travel direction, and therefore, is available at lower cost.

In a preferred embodiment of the present invention, the electric power assist system further includes a speed sensor 35 that outputs a signal in accordance with a moving speed of the electric assist vehicle. The controller (controller 170) acquires the speed information based on the signal in accordance with the moving speed, the signal being received from the speed sensor 35. The controller determines the inclination angle $\theta$ of the road surface based on the speed information and the acceleration signal.

The controller uses the acceleration signal that is output from the acceleration sensor 38 while the electric assist vehicle is running and the speed signal that is output from the speed sensor 35 to determine the inclination angle $\theta$ of the road surface. The speed sensor 35 is mounted on a general electric power assist system, and has a relatively low cost. Therefore, it is not necessary to use a gyrosensor or an acceleration sensor of high performance and high cost, and the inclination angle is calculated with a structure having a low cost as a whole.

In a preferred embodiment of the present invention, in the electric power assist system, the electric motor 35 includes a rotor and a position detection sensor (Hall sensor 46) detecting a position of the rotor of the electric motor 53, while the rotor is rotating. The controller determines a rotation speed w of the rotor based on an output of the position detection sensor, and multiples the rotation speed w by a constant to acquire the speed information. Even in the case in which the vehicle does not include the speed sensor 35, or even in the case in which the speed sensor 35 is out of order, the speed information is acquired based on the rotation speed of the electric motor 53.

In a preferred embodiment of the present invention, the electric assist vehicle includes a transmission mechanism including a plurality of transmission gear ranges and that outputs data representing a transmission gear range currently selected. The electric motor 53 includes a rotor and further includes a position detection sensor (Hall sensor 46) that detects a position of the rotor while the rotor is rotating. The controller acquires data representing the transmission gear range, determines a rotation speed ω of the rotor based on an output of the position detection sensor, and acquires the speed information based on the rotation speed ω and the data representing the transmission gear range. Even in the case in which the vehicle does not include the speed sensor 35, or even in the case in which the speed sensor 35 is out of order, the speed information is acquired based on the rotation speed of the electric motor 53.

In a preferred embodiment of the present invention, the electric assist vehicle includes a torque sensor 41 that detects a pedal torque provided by the rider. In the case in which the pedal torque is larger than a predefined threshold value, the controller acquires the speed information and detects the inclination angle of the road surface.

In the case in which the speed information is calculated while the rider is going down the descending slope without pedaling, there is a possibility that the calculated vehicle speed becomes zero although the actual vehicle speed V is not zero. The speed information is acquired when the pedal torque exceeds the threshold value (while the rider is pedaling), so that correct speed information is acquired.

In a preferred embodiment of the present invention, the controller calculates a time-differential value (dV/dt) of a speed V in the travel direction, subtracts the time-differential value (dV/dt) from the acceleration Gx in the travel direction, and divides the subtraction result by a gravitational acceleration G to determine the inclination angle of the road surface. The actual acceleration in the travel direction generated by the running and the gravitational acceleration are used to calculate the inclination angle with high precision.

In a preferred embodiment of the present invention, the controller may perform inverse sine transformation on the division result obtained by dividing the subtraction result by the gravitational acceleration G to determine the inclination angle of the road surface. The controller includes a table correlating each of a plurality of angles and a calculated value of a sine function for each of the angles. The controller divides the subtraction result by the gravitational acceleration G and refers to the table to acquire an angle corresponding to the division result, and determines the angle as the inclination angle of the road surface. The value obtained by dividing the difference between the acceleration Gx from the acceleration sensor 38 and the differential value of the speed V (i.e., acceleration value) by the gravitational acceleration G is a sine of the inclination angle. The controller may use this relationship to calculate the inclination angle of the road surface with high precision.

An illustrative electric assist vehicle according to a preferred embodiment of the present invention includes any one of the above-described electric power assist systems; and the speed sensor 35 that outputs a signal in accordance with a moving speed of the electric assist vehicle. Therefore, the electric assist vehicle has the exact advantages of any of the above-described electric power assist systems.

An illustrative electric power assist system (driving unit 51) according to a preferred embodiment of the present invention usable for an electric assist vehicle (electric assist bicycle 1) includes an electric motor 53 that generates an assist power to assist human power of a rider of the electric assist vehicle; a controller (controller 70) configured or programmed to control a magnitude of the assist power to be generated by the electric motor 53; and an acceleration sensor 38 that outputs an acceleration signal representing at least one of an acceleration Gx in a first direction as a travel direction of the electric assist vehicle and an acceleration Gz in a second direction perpendicular to both of the first direction and a road surface. The controller uses the acceleration signal to detect that the electric assist vehicle is in a stop state, determines an inclination angle of the road surface based on the acceleration signal that is output in the stop state, and causes the electric motor 53 to generate an assist power of a magnitude in accordance with the inclination angle $\theta_0$ when the rider starts pedaling the electric assist vehicle.

The electric power assist system uses the output signal of the sensor to detect that the electric assist vehicle is in a completely stop state, and detects the inclination angle $\theta_0$ in the stop state. With such a structure, the inclination angle $\theta_0$ is detected with high precision. Thus, an appropriate level of assist power is generated, and the ease of riding is improved at the start on a slope, for which assist is required.

For example, upon determining that the slope is ascending, the controller increases the assist power as the inclination angle $\theta_0$ is larger. With such a structure, the human power of the rider is assisted properly at the start on the ascending slope, when the rider feels that the load is heavier. Upon determining that the slope is descending, the controller decreases the assist power as the inclination angle $\theta_0$ is larger. With such a structure, high assist power is not generated on the descending slope, and thus acceleration on the descending slope is suppressed.

The electric power assist system preferably uses only the acceleration sensor 38 to determine that the electric assist vehicle is in a stop state and to determine the inclination angle. Therefore, it is not necessary to provide various sensors, and the cost is suppressed from increasing. The space in which the sensors are installed is decreased, and the structure is simplified.

In a preferred embodiment of the present invention, the controller further includes a stop detection circuit 81 that detects that the electric assist vehicle is in the stop state, based on the acceleration signal that is output from the acceleration sensor 38.

In a preferred embodiment of the present invention, in the case in which the acceleration signal representing at least one of the acceleration Gx in the first direction and the acceleration Gz in the second direction fulfills a predefined stop determination condition, the stop detection circuit 81 determines that the electric assist vehicle is at a stop.

In a preferred embodiment of the present invention, the stop determination condition includes a condition regarding a range of a signal level of the acceleration signal and a condition regarding a time period in which the acceleration signal is in the range of the signal level.

In a preferred embodiment of the present invention, the acceleration sensor 38 is a two-axis acceleration sensor or a three-axis acceleration sensor that outputs a first acceleration signal representing the acceleration Gx in the first direction and a second acceleration signal representing the acceleration Gz in the second direction. The stop detection circuit 81 stores the stop determination condition for each of the first acceleration signal and the second acceleration signal.

Another illustrative electric power assist system (driving unit 51) according to a preferred embodiment of the present invention usable for an electric assist vehicle (electric assist bicycle 1) includes an electric motor 53 that generates an assist power to assist human power of a rider of the electric assist vehicle; a controller (controller 70) configured or programmed to control a magnitude of the assist power to be generated by the electric motor 53; and an acceleration sensor 38 that outputs an acceleration signal representing at least one of an acceleration Gx in a first direction as a travel direction of the electric assist vehicle and an acceleration Gz in a second direction perpendicular to both of the first direction and a road surface. The controller receives a detection signal based on whether it is detected that the electric assist vehicle is at a stop or is running, the detection signal being received from at least one sensor 35, 41, 42 or

53 outputting the detection signal, and determines, based on the detection signal, that the electric assist vehicle is in a stop state. The controller determines an inclination angle of the road surface based on the acceleration signal that is output in the stop state, and causes the electric motor 53 to generate an assist power of a magnitude in accordance with the inclination angle when the rider starts pedaling the electric assist vehicle.

The controller uses the output signal of the sensor to determine that the electric assist vehicle is in a completely stop state, and determines the inclination angle in the stop state. With such a structure, the inclination angle is detected with high precision. Thus, an appropriate level of assist power is generated, and the ease of riding is improved at the start on a slope, for which assist is required.

For example, upon determining that the slope is ascending, the controller increases the assist power as the inclination angle is larger. With such a structure, the human power of the rider is assisted properly at the start on the ascending slope, when the rider feels that the load is heavier. Upon determining that the slope is descending, the controller decreases the assist power as the inclination angle is larger. With such a structure, high assist power is not generated on the descending slope, and thus acceleration on the descending slope is suppressed.

In a preferred embodiment of the present invention, the controller further includes a stop detection circuit 81 that determines that the electric assist vehicle is at a stop based on the detection signal that is output from the at least one sensor.

In a preferred embodiment of the present invention, the at least one sensor is one or a plurality of sensors among a speed sensor 45, a torque sensor 51, a crank rotation sensor 42, and a Hall sensor 46 detecting a rotation of the electric motor 53. In the case in which the detection signal fulfills a predefined stop determination condition, the stop detection circuit 81 determines that the electric assist vehicle is at a stop.

In a preferred embodiment of the present invention, in the case in which the at least one sensor is the speed sensor 35, which detects a speed of the electric assist vehicle, the stop detection circuit 81 determines that the electric assist vehicle is at a stop in the case in which the detection signal fulfills the stop determination condition, which is that the speed is lower than a predefined speed.

In a preferred embodiment of the present invention, the electric power assist system further includes a crankshaft to which a pedal is attached. In the case in which the at least one sensor is the torque sensor 41, which detects a torque applied to the crankshaft by a step on the pedal, the stop detection circuit 81 determines that the electric assist vehicle is at a stop in the case in which the detection signal fulfills the stop determination condition, which is that the torque is lower than a predefined torque value.

In a preferred embodiment of the present invention, the electric power assist system further includes a crankshaft to which a pedal is attached. In the case in which the at least one sensor is the crank rotation sensor, which detects a rotation of the crankshaft, the stop detection circuit 81 determines that the electric assist vehicle is at a stop in the case in which the detection signal fulfills the stop determination condition, which is that the number of rotations of the crankshaft within a predefined time period is zero.

In a preferred embodiment of the present invention, in the case in which the at least one sensor is the Hall sensor, the stop detection circuit 81 determines that the electric assist vehicle is at a stop in the case in which the detection signal fulfills the stop determination condition, which is that the number of rotations of the electric motor 53 within a predefined time period is zero.

In a preferred embodiment of the present invention, the controller includes a gradient calculation circuit 82 that calculates the inclination angle based on the acceleration signal that is output in the stop state, an assist power calculation circuit 83 that determines the magnitude of the assist power in accordance with the inclination angle, and a motor driving circuit that causes the electric motor 53 to generate the assist power determined by the assist power calculation circuit 83 when the rider starts pedaling the electric assist vehicle. The gradient calculation circuit 82 performs a calculation of $\arcsin(Gx/G)$ or $\arccos(Gz/G)$ by use of a gravitational acceleration G to determine the inclination angle.

In a preferred embodiment of the present invention, the acceleration sensor 38 is a two-axis acceleration sensor 38 or a three-axis acceleration sensor 38 that outputs a first acceleration signal representing the acceleration Gx in the first direction and a second acceleration signal representing the acceleration Gz in the second direction.

In a preferred embodiment of the present invention, the controller includes a gradient calculation circuit 82 that calculates the inclination angle based on the acceleration signal that is output in the stop state, an assist power calculation circuit 83 that determines the magnitude of the assist power in accordance with the inclination angle, and a motor driving circuit that causes the electric motor 53 to generate the assist power determined by the assist power calculation circuit 83 when the rider starts pedaling the electric assist vehicle. The gradient calculation circuit 82 performs at least one of calculations of $\arcsin(Gx/G)$, $\arccos(Gz/G)$ and $\arctan(Gx/Gz)$ by use of a gravitational acceleration G to determine the inclination angle.

In a preferred embodiment of the present invention, the assist power calculation circuit 83 stores in advance a rule defining a correlation between a magnitude of the inclination angle and the magnitude of the assist power, and uses the inclination angle calculated by the gradient calculation circuit 82 and the rule to determine the magnitude of the assist power.

In a preferred embodiment of the present invention, the electric power assist system further includes a switch selectable by the rider to select one of a plurality of driving modes that are different in the magnitude of the assist power while the electric assist vehicle is running. The assist power calculation circuit 83 stores in advance the rule for each of the driving modes, and uses the inclination angle calculated by the gradient calculation circuit 82 and the rule corresponding to the driving mode selected by use of the switch to determine the magnitude of the assist power when the rider starts pedaling the electric assist vehicle.

In a preferred embodiment of the present invention, the assist power calculation circuit 83 stores in advance, as the rule, a function of which the magnitude of the inclination angle is an input and the magnitude of the assist power is an output.

In a preferred embodiment of the present invention, the function is at least one of a discontinuous function, a linear continuous function and a nonlinear continuous function.

In a preferred embodiment of the present invention, the assist power calculation circuit 83 stores in advance a table correlating the magnitude of the inclination angle and the magnitude of the assist power.

In a preferred embodiment of the present invention, the gradient calculation circuit 82 uses the first acceleration signal and the second acceleration signal processed by a low-pass filter to calculate the inclination angle.

In a preferred embodiment of the present invention, the controller causes the electric motor 53 to generate the assist power in accordance with the inclination angle $\theta_0$, with start of pedaling being the time point at which the rider pedals the electric assist vehicle at most 5 times.

In a preferred embodiment of the present invention, the controller causes the electric motor 53 to generate the assist power in accordance with the inclination angle, with start of pedaling being the time point at which the rider pedals the electric assist vehicle at most 3 times.

In a preferred embodiment of the present invention, in the case in which the inclination angle $\theta_0$ is an elevation angle in the travel direction of the electric assist vehicle, the controller causes the electric motor 53 to generate an assist power sufficiently large to increase the inclination angle when the rider starts pedaling the electric assist vehicle.

In a preferred embodiment of the present invention, in the case in which the inclination angle $\theta_0$ is a declination angle in the travel direction of the electric assist vehicle, the controller causes the electric motor 53 to generate an assist power sufficiently small to increase the inclination angle when the rider starts pedaling the electric assist vehicle.

An illustrative electric assist vehicle according to a preferred embodiment of the present invention includes any one of the above-described electric power assist systems.

An illustrative electric assist vehicle according to a preferred embodiment of the present invention includes the electric power assist system in any one of the above-described various forms; and the at least one sensor.

Preferred embodiments of the present invention are especially useful for a vehicle that includes an acceleration sensor and is driven by human power assisted by assist power, for example.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An electric power assist system for an electric assist vehicle, the electric power assist system comprising:
    an electric motor that generates an assist power to assist human power of a rider of the electric assist vehicle;
    a controller configured or programmed to control a magnitude of the assist power to be generated by the electric motor; and
    an acceleration sensor that outputs an acceleration signal representing an acceleration Gx in a travel direction of the electric assist vehicle; wherein
    the controller is configured or programmed to acquire speed information representing a running speed of the electric assist vehicle based on an external signal; and
    the controller is configured or programmed to determine an inclination angle of a road surface based on the speed information and the acceleration signal, and to cause the electric motor to generate an assist power of a magnitude in accordance with the inclination angle.

2. The electric power assist system of claim 1, further comprising:
    a speed sensor that outputs a signal in accordance with a moving speed of the electric assist vehicle; wherein
    the controller is configured or programmed to acquire the speed information based on the signal received from the speed sensor in accordance with the moving speed; and
    the controller is configured or programmed to determine the inclination angle of the road surface based on the speed information and the acceleration signal.

3. The electric power assist system of claim 1, wherein
    the electric motor includes a rotor and a position detection sensor that detects a position of the rotor while the rotor is rotating; and
    the controller is configured or programmed to determine a rotation speed of the rotor based on an output of the position detection sensor, and to multiply the rotation speed by a constant to acquire the speed information.

4. The electric power assist system of claim 1, wherein
    the electric assist vehicle includes a transmission including a plurality of transmission gear ranges and that outputs data representing a transmission gear range currently selected;
    the electric motor includes a rotor and a position detection sensor that detects a position of the rotor while the rotor is rotating; and
    the controller is configured or programmed to:
        acquire data representing the transmission gear range;
        determine a rotation speed of the rotor based on an output of the position detection sensor; and
        acquire the speed information based on the rotation speed and the data representing the transmission gear range.

5. The electric power assist system of claim 2, wherein the controller is configured or programmed to:
    calculate a time-differential value of a speed in the travel direction;
    subtract the time-differential value from the acceleration in the travel direction; and
    divide the subtraction result by a gravitational acceleration to determine the inclination angle of the road surface, and
    wherein the controller is configured or programmed to perform an inverse sine transformation on a division result obtained by dividing the subtraction result by the gravitational acceleration to determine the inclination angle of the road surface.

6. The electric power assist system of claim 2, wherein the controller is configured or programmed to:
    calculate a time-differential value of a speed in the travel direction;
    subtract the time-differential value from the acceleration in the travel direction; and
    divide the subtraction result by a gravitational acceleration to determine the inclination angle of the road surface, and
    wherein
    the controller includes a table that correlates each of a plurality of angles and a calculated value of a sine function for each of the angles; and
    the controller is configured or programmed to divide the subtraction result by the gravitational acceleration, to refer to the table to acquire an angle corresponding to the division result, and to determine the angle as the inclination angle of the road surface.

7. An electric assist vehicle comprising:
    the electric power assist system according to claim 1; and
    a speed sensor that outputs a signal in accordance with a moving speed of the electric assist vehicle.

8. An electric power assist system for an electric assist vehicle, the electric power assist system comprising:
- an electric motor that generates an assist power to assist human power of a rider of the electric assist vehicle;
- a controller configured or programmed to control a magnitude of the assist power to be generated by the electric motor; and
- an acceleration sensor that outputs an acceleration signal representing at least one of an acceleration in a first direction as a travel direction of the electric assist vehicle and an acceleration in a second direction perpendicular to both of the first direction and a road surface; wherein
- the controller is configured or programmed to use the acceleration signal to determine that the electric assist vehicle is in a stop state, to determine an inclination angle of the road surface based on the acceleration signal that is output in the stop state, and to cause the electric motor to generate an assist power of a magnitude in accordance with the inclination angle when the rider starts pedaling the electric assist vehicle.

9. The electric power assist system of claim 8, wherein the controller further includes a stop detection circuit that determines that the electric assist vehicle is in the stop state based on the acceleration signal that is output from the acceleration sensor.

10. The electric power assist system of claim 9, wherein in a case in which the acceleration signal representing at least one of the acceleration in the first direction and the acceleration in the second direction fulfills a predefined stop determination condition, the stop detection circuit determines that the electric assist vehicle is at a stop.

11. The electric power assist system of claim 10, wherein the stop determination condition includes a condition regarding a range of a signal level of the acceleration signal and a condition regarding a time period in which the acceleration signal is in the range of the signal level.

12. The electric power assist system of claim 11, wherein
- the acceleration sensor is a two-axis acceleration sensor or a three-axis acceleration sensor that outputs a first acceleration signal representing the acceleration in the first direction and a second acceleration signal representing the acceleration in the second direction; and
- the stop detection circuit stores the stop determination condition for each of the first acceleration signal and the second acceleration signal.

13. The electric power assist system of claim 8, wherein the controller is configured or programmed to include:
- a gradient calculation circuit that calculates the inclination angle based on the acceleration signal that is output in the stop state;
- an assist power calculation circuit that determines the magnitude of the assist power in accordance with the inclination angle; and
- a motor driving circuit that causes the electric motor to generate the assist power determined by the assist power calculation circuit when the rider starts pedaling the electric assist vehicle; and
- the gradient calculation circuit performs a calculation of arcsin(Gx/G) or arccos(Gz/G), in which G is a gravitational acceleration, to determine the inclination angle.

14. The electric power assist system of claim 8, wherein the acceleration sensor is a two-axis acceleration sensor or a three-axis acceleration sensor that outputs a first acceleration signal representing the acceleration in the first direction and a second acceleration signal representing the acceleration in the second direction.

15. The electric power assist system of claim 14, wherein the controller is configured or programmed to include:
- a gradient calculation circuit that calculates the inclination angle based on the acceleration signal that is output in the stop state;
- an assist power calculation circuit that determines the magnitude of the assist power in accordance with the inclination angle; and
- a motor driving circuit that causes the electric motor to generate the assist power determined by the assist power calculation circuit when the rider starts pedaling the electric assist vehicle; and
- the gradient calculation circuit performs at least one of calculations of arcsin(Gx/G), arccos(Gz/G), and arctan(Gx/Gz), in which G is a gravitational acceleration, to determine the inclination angle.

16. The electric power assist system of claim 15, wherein the assist power calculation circuit stores in advance a rule defining a correlation between a magnitude of the inclination angle and the magnitude of the assist power, and uses the inclination angle calculated by the gradient calculation circuit and the rule to determine the magnitude of the assist power.

17. The electric power assist system of claim 16, further comprising:
- a switch selectable by the rider to select one of a plurality of driving modes that are different in the magnitude of the assist power while the electric assist vehicle is running; and
- the assist power calculation circuit stores in advance the rule for each of the plurality of driving modes, and uses the inclination angle calculated by the gradient calculation circuit and the rule corresponding to the driving mode selected by the switch to determine the magnitude of the assist power when the rider starts pedaling the electric assist vehicle.

18. The electric power assist system of claim 14, wherein the gradient calculation circuit uses the first acceleration signal and the second acceleration signal output by a low-pass filter to calculate the inclination angle.

19. The electric power assist system of claim 8, wherein the controller is configured or programmed to cause the electric motor to generate the assist power in accordance with the inclination angle, with a start of pedaling being a time point at which the rider pedals the electric assist vehicle at most 5 times.

20. An electric assist vehicle comprising the electric power assist system of claim 8.

21. An electric power assist system for an electric assist vehicle, the electric power assist system comprising:
- an electric motor that generates an assist power to assist human power of a rider of the electric assist vehicle;
- a controller configured or programmed to generate a signal that controls an electric current in the electric motor to control a magnitude of the assist power to be generated by the electric motor; and
- an acceleration sensor that outputs an acceleration signal representing at least one of an acceleration in a first direction as a travel direction of the electric assist vehicle and an acceleration in a second direction perpendicular to both of the first direction and a road surface;
- the controller is configured or programmed to receive a detection signal based on whether the electric assist vehicle is at a stop or is running, the detection signal being received from at least one sensor that outputs the detection signal; and the controller is configured or programmed to determine, based on the detection signal, that the electric assist vehicle is in a stop state, to determine an inclination angle of the road surface based on the acceleration signal that is output in the stop state, and to cause the electric motor to generate an assist power of a magnitude in accordance with the inclination angle when the rider starts pedaling the electric assist vehicle.

22. The electric power assist system of claim 21, wherein the controller further includes a stop detection circuit that determines that the electric assist vehicle is in the stop state based on the detection signal that is output from the at least one sensor.

23. The electric power assist system of claim 22, wherein
the at least one sensor is one or a plurality of sensors among a speed sensor, a torque sensor, a crank rotation sensor, and a Hall sensor that detects a rotation of the electric motor; and
in a case in which the detection signal fulfills a predefined stop determination condition, the stop detection circuit determines that the electric assist vehicle is at a stop.

24. An electric assist vehicle comprising:
the electric power assist system according to claim 21; and
the at least one sensor.

* * * * *